(12) United States Patent
Brodersen et al.

(10) Patent No.: US 6,732,111 B2
(45) Date of Patent: May 4, 2004

(54) METHOD, APPARATUS, SYSTEM, AND PROGRAM PRODUCT FOR ATTACHING FILES AND OTHER OBJECTS TO A PARTIALLY REPLICATED DATABASE

(75) Inventors: Robert A. Brodersen, Redwood City, CA (US); Prashant Chatterjee, Saratoga, CA (US); Jeffrey I. Cohen, Sunnyvale, CA (US); Peter Siam Sy Lim III, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 67 days.

(21) Appl. No.: 10/407,483

(22) Filed: Apr. 4, 2003

(65) Prior Publication Data

US 2003/0191743 A1 Oct. 9, 2003

Related U.S. Application Data

(63) Continuation of application No. 09/653,705, filed as application No. PCT/US99/04696 on Mar. 3, 1999, now abandoned.
(60) Provisional application No. 60/076,681, filed on Mar. 3, 1998.

(51) Int. Cl.[7] .................................................. G06F 17/30
(52) U.S. Cl. ...................................................... 707/101
(58) Field of Search .............................. 707/101, 100; 715/512

(56) References Cited

U.S. PATENT DOCUMENTS

| 5,483,651 | A | | 1/1996 | Adams et al. |
|---|---|---|---|---|
| 5,530,852 | A | | 6/1996 | Meske, Jr. et al. |
| 5,613,108 | A | | 3/1997 | Morikawa |
| 5,623,591 | A | | 4/1997 | Cseri |
| 5,647,002 | A | | 7/1997 | Brunson |
| 5,778,368 | A | | 7/1998 | Hogan et al. |
| 5,781,901 | A | | 7/1998 | Kuzma |
| 5,855,014 | A | | 12/1998 | Smith |
| 5,857,203 | A | | 1/1999 | Kauffman et al. |
| 5,903,723 | A | | 5/1999 | Beck et al. |
| 6,058,389 | A | | 5/2000 | Chandra et al. |
| 6,108,657 | A | * | 8/2000 | Shoup et al. ............... 707/100 |
| 6,167,392 | A | * | 12/2000 | Ostrovsky et al. ............. 707/2 |
| 6,199,106 | B1 | | 3/2001 | Shaw et al. |
| 6,502,099 | B1 | * | 12/2002 | Rampy ....................... 707/101 |
| 6,507,847 | B1 | * | 1/2003 | Fleischman ................. 707/101 |
| 6,523,041 | B1 | * | 2/2003 | Morgan et al. ............. 707/102 |

FOREIGN PATENT DOCUMENTS

| US | US99/04696 | 5/2000 |
|---|---|---|
| WO | WO99/45482 | 9/1999 |

* cited by examiner

*Primary Examiner*—Greta Robinson
(74) *Attorney, Agent, or Firm*—James W. Soong; Perkins Coie LLP

(57) ABSTRACT

Attaching files and other objects in a distributed computing environment. This includes adding file attachments and non-database objects, such as, text file data, web file data, image file data, and other file attachment objects to databases. These objects may be retrieved at the convenience of a node to which the objects are sent. Visibility rules can be set to determine which attachments and objects are seen by a node. Distribution rules for an object determine whether a node must request the object or whether the node is forced to receive the object.

19 Claims, 6 Drawing Sheets

| BREAK LINK | UPDATE FROM SOURCE | CHANGE SOURCE | |
|---|---|---|---|

| NAME | SOURCE | SIZE | TIME STAMP |
|---|---|---|---|
|  |  |  |  |
|  |  |  |  |
|  |  |  |  |
|  |  |  |  |
|  |  |  |  |

OK    CANCEL

METHOD, APPARATUS, SYSTEM, AND PROGRAM PRODUCT FOR ATTACHING FILES AND OTHER OBJECTS TO A PARTIALLY REPLICATED DATABASE

CROSS-REFERENCE TO RELATED APPLICATIONS

This application is a continuation of U.S. patent application Ser. No. 09/653,705, filed Sep. 1, 2000 now abandoned, which is a continuation to International Patent Application PCT/US99/04696, filed Mar. 3, 1999, which claims the benefit of U.S. Provisional Patent Application No. 60/076,681, filed Mar. 3, 1998, each of which is incorporated herein in its entirety by reference.

FIELD OF THE INVENTION

This invention relates to database management systems, database management methods, database management apparatus, and database management program products for adding file attachments and non-database objects, such as, text file data, web file data, image file data, and other file attachment objects to databases. The text data, web based data, and other objects may be retrieved when the data to which they relate is retrieved.

BACKGROUND OF THE INVENTION

Relational databases are a commonly-employed data structure for representing data in a business or other environment. A relational database represents data in the form of a collection of two-dimensional tables. Each table comprises a series of cells arranged in rows and columns. Typically, a row in a table represents a particular observation. A column represents either a data field or a pointer to a row in another table.

For example, a database describing an organizational structure may have one table to describe each position in the organization, and another table to describe each employee in the organization. The employee table may include information specific to the employee, such as name, employee number, age, salary, etc. The position table may include information specific to the position, such as the position title ("salesman", "vice president", etc.), a salary range, and the like. The tables may be related by, for example, providing in each row of the employee table a pointer to a particular row in the position table, coordinated so that, for each row in the employee table, there is a pointer to the particular row in the position table that describes that employee's position. A relational database management system (RDBMS) supports "joining" these tables in response to a query from a user, so that the user making a query about, for example, a particular employee, may be provided with a report of the selected employee, including not only the information in the employee table, but also the information in the related position table.

Relational databases may be much more complex than this example, with several tables and a multiplicity of relations among them. Moreover, it is frequently desirable to add other objects, such as text data files, image data files, Web data files, and the like, to such databases.

With the widespread use of inexpensive portable computers, it is advantageous to replicate a database onto a portable computer for reference at locations remote from the central computer. The replicated database may then be referenced by the user of the portable computer, without requiring reference to the main database, which may be maintained at a central location inconvenient to the user of the portable computer. However, there are a number of difficulties with the use of a replicated database.

One disadvantage is that a full copy of the central database may require more data storage than is desired or economical. For example, a salesman working in the field may need to refer to the database for information regarding sales opportunities in his sales area, but have no need to refer to any information regarding sales opportunities outside of his area.

One possible approach to reduce the amount of required data storage is to simply replicate only that portion of the database that is needed by the user. However, this approach does not recognize that the criteria to determine which portions of the data are required is likely to vary over time. For example, the salesman may have a new city added to his territory. Under conventional approaches, the salesman would need to re-replicate his local copy of the database, this time selecting data including the added city. Such a practice is inconvenient, subject to error, and time-consuming.

A further disadvantage to a replicated database is the difficulties encountered in attempting to update data using the replicated copy. A change made to the replicated database is not made to the central database, leading to a discrepancy between the information that is stored in the replicated copy of the database and the information that is stored in the central database. Although it is possible to journal modifications made to the replicated copy and apply an identical modification to the central database, one problem that this approach faces is the possibility of colliding updates; that is, where a user of a replicated copy makes a change to data that is also changed by a user of the central copy or by the user of another replicated copy.

A still further disadvantage of many database management systems is the difficulty of adding text data file attachments, image data file attachments, web based data file attachments, and other objects to relational databases.

It is therefore desirable to provide a capability to maintain one or more partially-replicated copies of a central database, in such a way that the degree of replication may be easily changed without requiring a refresh of the entire replicated database, and that permits updates to be coordinated among users of the central database and users of the partially replicated databases. It is especially desirable to allow updates by the attachments of objects to the database, which objects can be retrieved along with the data items to which they relate.

OBJECTS OF THE INVENTION

It is a primary object of our invention to enable users to attach file attachments, including text data file attachments, image data file attachments, Web based data file attachments, and the like, to any business object that a developer or configurator chooses.

It is a further primary object of our invention to automatically replicate file attachments to all docking clients that have visibility to the business object. This is to enable users to update files on any database—server or mobile—and synchronize the files among all databases.

It is a still further primary object of our invention to enable mobile users to defer downloading of files, and in this way minimize connect time. This allows mobile users to request the deferred files in future docking sessions.

It is still a further primary object of our invention to provide software platform having a pre-defined, specialized business component that supports creating, updating and deleting file attachments. This is to permit developers and configurators to easily enable 20 file attachments on any business object by creating an applet that uses this specialized business component and adding the applet.

SUMMARY OF THE INVENTION

These and other objects of the invention are achieved by the method, system, apparatus, and program product of our invention.

Thus, according to our invention users may attach non-database objects, such as files and file attachments to any business object that a developer or configurator chooses. Our invention further provides for automatic replication of file attachments to all docking clients that have visibility to the business object. This is to enable users to update files and related non-database objects and attachments on any database—server or mobile—and synchronize the files among all databases.

It is also possible, using the method and apparatus of our invention to enable mobile users to defer downloading of files and related non-database objects and attachments, and in this way minimize connect time. This allows mobile users to request the deferred files in future docking sessions.

It is also possible, using the method, apparatus, system, and program product of our invention to provide a software platform having a pre-defined, specialized business component that supports creating, updating and deleting file attachments and non-database object files. This is to permit developers and configurators to easily enable file attachments on any business object by creating an applet that uses this specialized business component and adding the applet.

The method, apparatus, system, and program product of our invention supports the following file attachment attributes:

Multiple Versions. The method, apparatus, system, and program product of our invention allow users to create multiple versions of a file.

File attachments for any business object. The method, apparatus, system, and program product of our invention allows users to configure file attachments on any business object including service requests, opportunities, quotes, agreements, and the like.

The method, apparatus, system, and program product of our invention provide a business object tool for users to register any file. The business object tool supports object file teams so that one user can register a non-database object file or file attachment and add other users to the file team. All users on the file team can view the non-database object file or file attachment. The non-database object file or file attachment is automatically distributed to all users on the team.

The method, apparatus, system, and program product of our invention provide remote support for the following functions:

The system, apparatus, method, and program product of our invention provide support for distribution of literature and correspondence templates. This includes letting mobile users request literature, e.g., in the appropriate screen or menu, screen, download the requested literature in the next docking session, and distribute published literature and correspondence templates.

The system, method, apparatus, and program product of our invention automatically replicates file table rows and the associated file attachments or non-database file objects to docking clients that have visibility to the files. When the Transaction Router routes a file table row, it also writes information about the associated file attachments or non-database file objects to a suitable file. When a docking client sends or retrieves the transactions on file table rows, it also sends and retrieves the associated file attachments or non-database file objects for the file table row. When data merge applies file table rows to a database, it also copies the file to the local file system.

In a preferred exemplification, the system, method, apparatus, or program product of our invention replicates all associated files to regional databases.

The method, apparatus, system, and program product of our invention manages a database having at least one database table that has rows and columns. A row corresponds to a database object, and a column corresponds to an attribute of the object. An attribute is a reference to a non-database object file or a file attachment.

Ease of use by the end user. End users can easily create, update and delete files. Moreover, files are automatically replicated to docking clients. Ease of administration. Our invention provides several easy ways for administrators to register file attachments.

Developers and configurators can easily enable file attachments by using pre-built specialized business components, frames, and applets. In this way, developers and configurators do not need to write new code to take advantage of standard feature such as drag and drop, updating files, conflict resolution and the like.

The method, apparatus, system, and program product of our invention allows users to create files by copying external files that are stored in, for example, a file system or web page. Moreover, the method, apparatus, system, and program product of our invention can automatically update the copy of the file from the original external file.

The method, apparatus, system, and program product of our invention allows different business objects to share the same copy of a file. For example, two service requests can share the same file; similarly, an opportunity and a service request can share the same file.

The method, apparatus, system, and program product of our invention supports attachments of local html files. To be noted is that html files frequently include other files.

The method, apparatus, system, and program product of our invention allows users to update files anywhere (i.e. while connected to the server database or a mobile client) and replicate the updated files to all docking clients that have visibility to the file. Docking resolves uniqueness and update conflicts among files to guarantee consistency across all databases.

The method, apparatus, system, and program product of our invention routes files to docking clients using visibility rules. Moreover, the method, apparatus, system, and program product of our invention supports a robust set of visibility rules that determine which files are transferred to which nodes. These visibility rules include specifying all files of a certain type (e.g. published literature), user selected files (e.g. literature retrieval), files attached to a visible object (e.g. attachments to quotes, agreements, service requests and so on).

The method, apparatus, system, and program product of our invention replicates files with their associated database transactions to guarantee transaction integrity on all docking clients.

The method, apparatus, system, and program product of our invention lets a mobile user to defer file downloads in docking session so users can reduce the duration of a docking session. For example, restrict file downloads to a maximum size, certain file types, etc.

Only mobile users can defer file downloads. Regional databases and server databases always get all files.

The method, apparatus, system, and program product of our invention lets mobile users request files that were deferred. Moreover, the method, apparatus, system, and program product of our invention downloads the requested files in the next docking session. Downloading requested files must be fast and not burden the server database. If a file is deferred (i.e. there is a row in the local database saying the file exists, but the actual file is not available on the mobile client), the mobile user requests the file (by clicking on something) and the method, apparatus, system, and program product of our invention retrieves the file in the next docking session.

The method, apparatus, system, and program product of our invention lets mobile users delete requested files from the mobile client's local disk to minimize disk usage.

The method, apparatus, system, and program product of our invention supports file access from different data sources, for example, both connected users and a mobile user. In this regard, the server must be able to differentiate between which files are available and which files are not.

The system, method, apparatus, and program product of our invention must initialize files as well as data when extracting and initializing a docking client.

The system, method, apparatus, and program product of our invention distributes files to regional databases as well as mobile clients. This includes routing the files up from docking clients to server databases and vice versa.

According to our invention, users use a consistent user interface (i.e. a file attachment applet) to create, update and delete files. Developers and configurators can add a file attachment applet to any existing object. They can also enhance or override the behavior of the file attachment to suit their needs.

When a user creates a new data entry or file, the client function of our invention inserts a row in a table that stores information about files. These file tables store file information including the name, size, original source (e.g. the type and full path name of the source file) and docking statuses of the file. Developers and configurators must create a file table for each file attachment applet.

The client function also stores a copy of the file, with an internal name, in the file system. The data base management system may store each file in a compressed format to reduce disk usage. For connected users, the file system is a collection of directories on the file server, which is specified by a value in a file, as, for example, a configuration files. For mobile users, the file system typically resides on the mobile client's local disk, typically under a suitable directory, for example, a client installation directory.

When a user accesses a file, the client uncompresses (if compressed) and copies the file from the file system to a temporary directory and invokes the appropriate program to display and edit the file (e.g. Microsoft Word). If the user modifies the file, the client updates the file information in the file table and copies the modified file from the temporary directory to the file system.

The system, method, apparatus, and program product of our invention lets mobile users defer downloading of selected files and those associated files, file attachments, and non-database file objects to minimize connect time. The mobile user specifies the files that he wants to defer by setting docking session preferences in a control file, for example, a file synchronize dialog box. For example, the mobile user may want to defer downloading files greater than 1 Ok. When the mobile user navigates to a screen that displays files, the client shows whether each file exists, the file does not exist or the file is out-of-date in the local file system.

The system, method, apparatus, and program product of our invention lets mobile users request files that were previously deferred or are out-of-date. Thus, the system, method, apparatus, or program product of our invention retrieves an up-to-date copy of the file in the next docking session.

The system, method, apparatus, and program product of our invention allows use of revisions to support concurrent access and transaction semantics.

The system, method, apparatus, and program product of our invention allows use of rules which control how a file attachment is deferred that are distinct from routing and conflict resolution rules.

THE FIGURES

The method, apparatus, structure, system, and program product of our invention may be understood by reference to the Figures appended hereto.

FIG. 1 shows the creation of files for connected users. As there shown, a user creates a new file in the client screen. This file is compressed and copied to the file system and the local file cache. The file table row is then written, and the transaction logged to the database.

FIG. 2 shows how a connected user views and modifies a file. The user selects an existing file, e.g., by double clicking. This causes the file to be copied to the local file cache, if needed. This file is then uncompressed and copied to a temporary directory. If the file is user modified, the user modified file is compressed and copied back to the file system and the local file cache. The modified file and the transaction are written to the database.

FIG. 3 shows changes to a control file, as a configuration file, to support local file caching.

FIG. 4 shows retrieving and applying files and transactions to mobile clients. As shown, a transaction router writes transactions and file attachments to appropriate files. A docking client retrieves the files to the client's inbox, and also retrieves files from the server. If the file exists in the client's inbox, it is copied to the local client's inbox. Otherwise a request is submitted to retrieve the file, e.g., in the next session. The transactions are applied to the local database, and the file's status is updated.

FIG. 5 illustrates sending and applying files and transactions from mobile clients. Here, a docking client writes files to the client's outbox, and sends the files to the client's inbox. The docking client also sends files from the local files system to the client's inbox. A merge function applies the files to the file server, and a transaction manager applies the transactions to the server database.

DETAILED DESCRIPTION OF THE INVENTION

The method, apparatus, system, and program Product of our invention enable individual users of a replicated or partially replicated database to attach files, non-database file objects, file attachments, and the like, including, by way of example, text data file attachments, image data file attachments, and web-based file data attachments, to any business object that a user, developer or configurator chooses. This is accomplished using a software platform having a pre-defined, specialized business component that supports creating, updating and deleting file attachments. The software platform permits users, developers and configurators to easily enable file attachments on any business object by creating, adding, and/or using an applet that utilizes this specialized business component. End users, developers and configurators can easily enable file attachments by using pre-built specialized business components, frames, and applets. In this way, end-users, developers and configurators do not need to write new code to take advantage of standard feature such as drag and drop, updating files, conflict resolution and the like. A non-database file object or a file attachment is an object that is referenced in an attribute column of a database table or an attribute filed or cell of a row of a database table. A file attachment is callable or retrievable or addressable by such reference, but is not in a database table By way of example, a non-database file object or a file attachment is a text file, such as a brochure, circular, etc.), an image file (MPEG, JPEG, bitmap, etc.), a URL, a sound file, or an application.

File attachment further includes automatic replication of file attachments to all docking clients that have visibility to the business object. This is to enable users to update files on any database—server or mobile—and synchronize the files among all databases.

Figure 1:
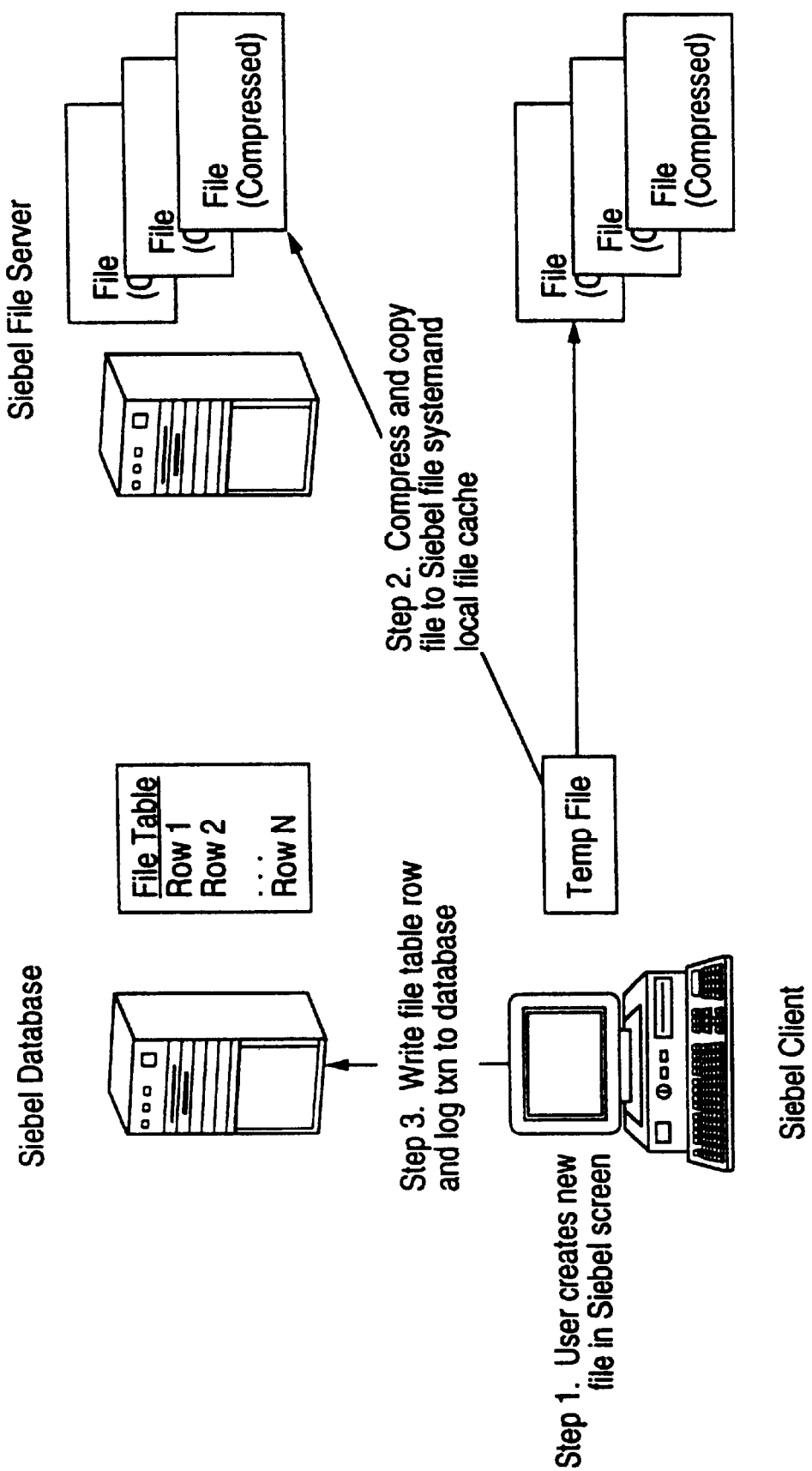

FIG. 1 shows the creation of files for connected users. As there shown, a user creates a new file in the client screen. This file is compressed and copied to the file system and the local file cache. The file table row is then written, and the transaction logged to the database.

Specifically, FIG. 1 shows creating files for connected users. As there shown, a user creates a new file in the client screen. This file is compressed and copied to the file system and the local file cache. The file table row is then written, and the transaction logged to the database. An aspect of our invention shown in FIG. 1 is the implementation of changes to the configuration file to support Local File Cache.

Figures 3, 7:
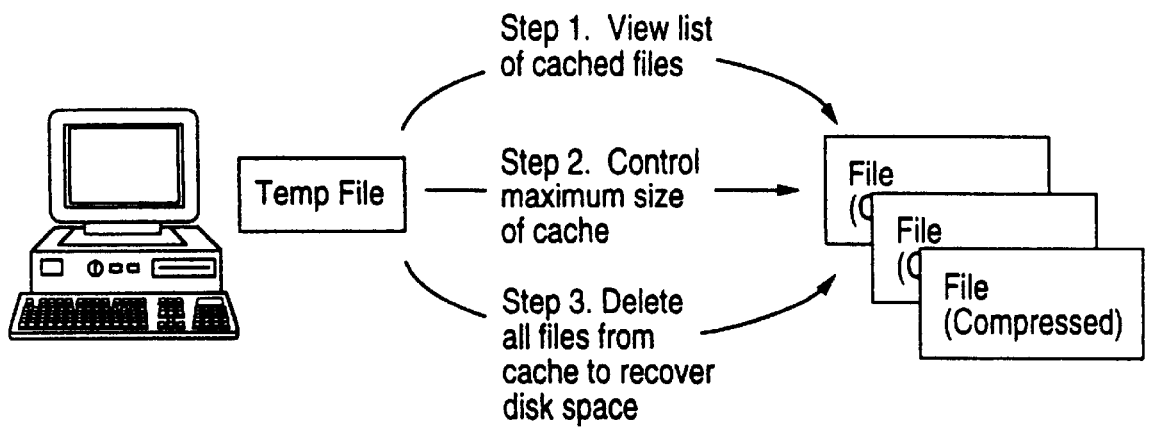
FIG. 7 is a screen view of a specialized frame for file attachments according to one embodiment of our invention. The ediut links are "Name", "Source", "Size", and "Time Stamp", and the actions are "Break Link", "Update from Source", and "Change Source", with "OK" and "Cancel".

The client automatically maintains a local file cache to improve file access performance. Whenever a user views a file and has access to a file server as shown in FIG. 1, the client first tries to open the file from the local file cache before reading the file from the file server. The user can manage the local file cache (similar to web browsers). The user can view a list of files that are currently cached on the local disk, control the maximum size of the cache and delete all files from the cache to recover local disk space. Changes to a control file to support local file caching are also shown in FIG. 3.

Figure 2:
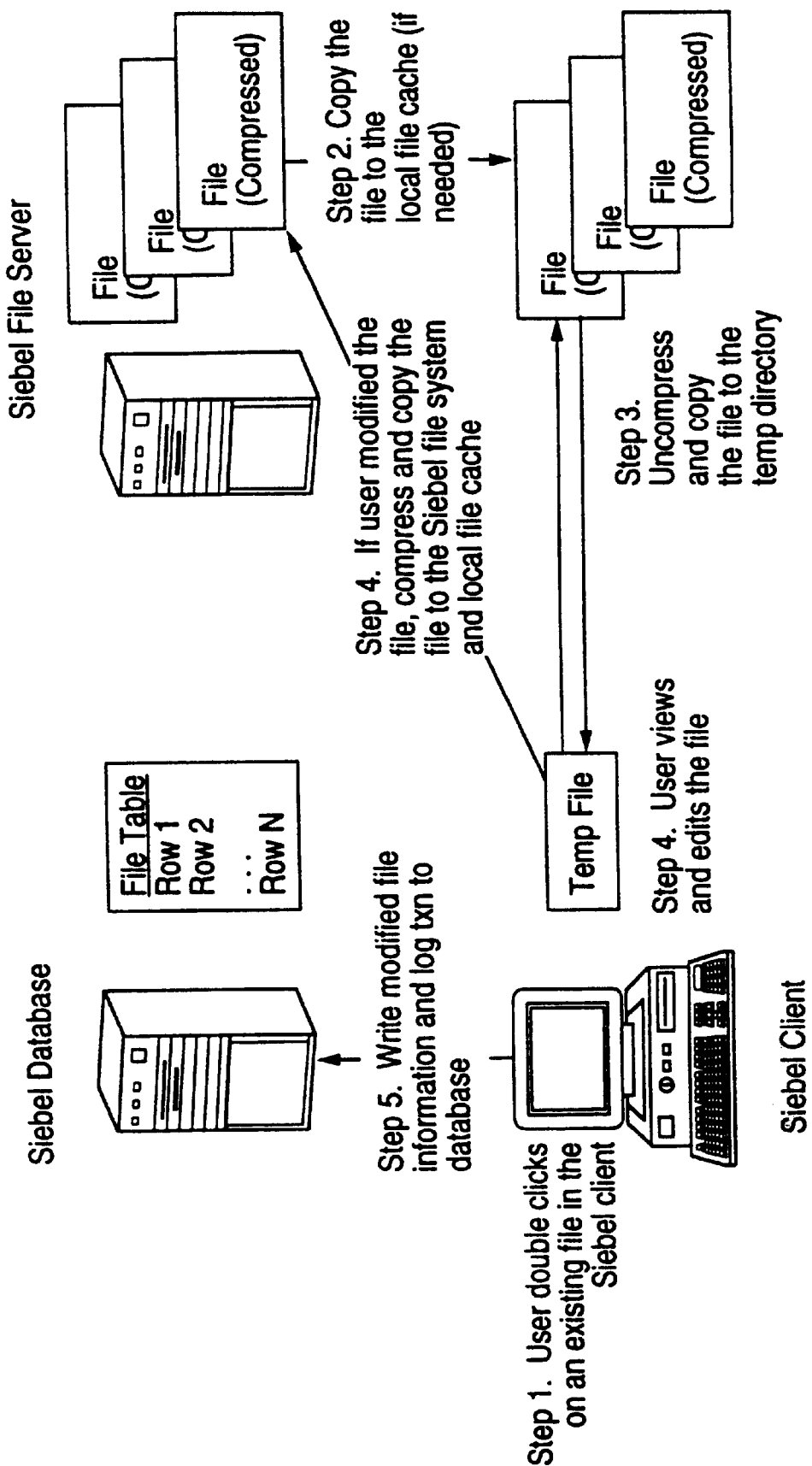

FIG. 2 shows how a connected user views and modifies a file. The user selects an existing file, e.g., by double clicking. This causes the file to be copied to the local file cache, if needed. This file is then uncompressed and copied to a temporary directory. If the file is user modified, the user modified file is compressed and copied back to the file system and the local file cache. The modified file and the transaction are written to the database.

A specialized frame and business component provides an "Update Link" method that lets the user update the copy of the file attachment if the original file or file attachment is changed.

When a user views an existing file attachment, the database management system of the invention uncompresses and copies the file attachment from the file system to a temporary directory. The database management system of the invention then invokes the appropriate procedure or program to display and edit the file attachment. If the user modifies the file attachment, the database management system of the invention updates the file attachment information in the file table and copies the modified file attachment from the temporary directory to the file system.

When a user deletes a file table row, the database management system of the invention automatically deletes the file attachments referenced therein from the file system and deletes the file table row from the database.

The client automatically maintains a local file cache to improve file access performance. Whenever a user views a file and has access to a file server as shown in FIG. 1, the client first tries to open the file from the local file cache before reading the file from the file server. The user can manage the local file cache (similar to web browsers). The user can view a list of files that are currently cached on the local disk, control the maximum size of the cache and delete all files from the cache to recover local disk space.

To add the ability to manage files in a business object, developers or end-users may add a specialized frame and business component to the business object. Developers can subclass from the specialized frame and business component to add additional functionality.

FIG. 3 shows changes to a control file, as a configuration file, to support local file caching.

Figure 4:
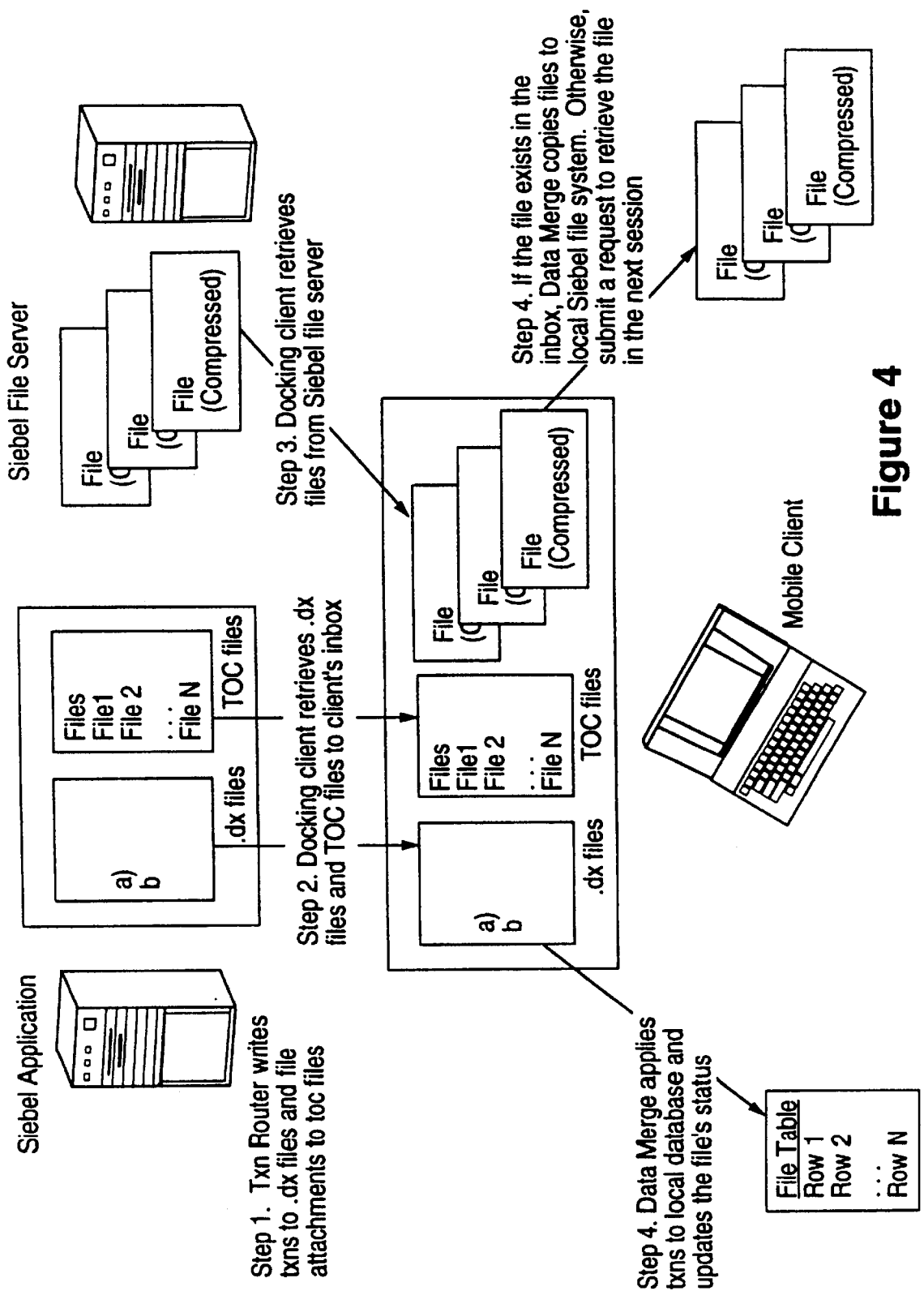

FIG. 4 shows retrieving and applying files and transactions to mobile clients. As shown, a transaction router writes transactions and file attachments to appropriate files. A docking client retrieves the files to the client's inbox, and also retrieves files from the server. If the file exists in the client's inbox, it is copied to the local client's inbox. Otherwise a request is submitted to retrieve the file, e.g., in the next session. The transactions are applied to the local database, and the file's status is updated.

When retrieving .dx files from a docking server to a mobile client, the docking client also retrieves the associated files for each .dx file. The docking client writes the associated files to the docking client's inbox directory using the internal name of the files (e.g. <ROW_ID>.<extension>). The docking client only retrieves the file if the file does not already exist in the inbox directory or has a different size or update date. This is described in Appendix 7, Redundant Transfer.

The docking client can defer downloading of certain files. The docking client reads the TOC file to determine which files to download and which files to defer.

The mobile user sets preferences for file downloads including file attachment downloads in the database management system of the invention.

In an Advanced dialog box the mobile user has several ways to specify which files and file attachments to defer:

For each business object, specify retrieve files flag: If the value is yes, the docking client retrieves files associated with this business object. However, if the value is no, the docking client defers all files associated with this business object, except if the row's defer flag is set to Yes.

For each business object, the user specifies maximum file size to retrieve files less than or equal to the maximum size. The database management system of the invention also provides additional criteria such as "retrieve all files with a certain extension," file name, etc. For each business object, the database management system of the invention specifies minimum visibility strength of the file table row's dock object instance. The database management system of the invention retrieves the file if the dock object instance is greater than or equal to the minimum visibility strength. The database management system of the invention does not retrieve the file if the dock object instance is less than the minimum visibility strength.

For each row in a file table, it is possible to use the defer flag. Thus, if the value is yes, the docking client can defer getting the file. But, if the value is no, the docking client must always retrieve this file, even if the user has specified not to retrieve files for this business object or files greater than the maximum size.

These options may be stored as a file on the docking client or in the local database, or, in a node type table that gets replicated to server database.

The Replication Agent always retrieves all files to ensure that all files on the regional database's file system are up-to-date. The Replication Agent cannot defer downloading of files to the regional database.

Figure 5:
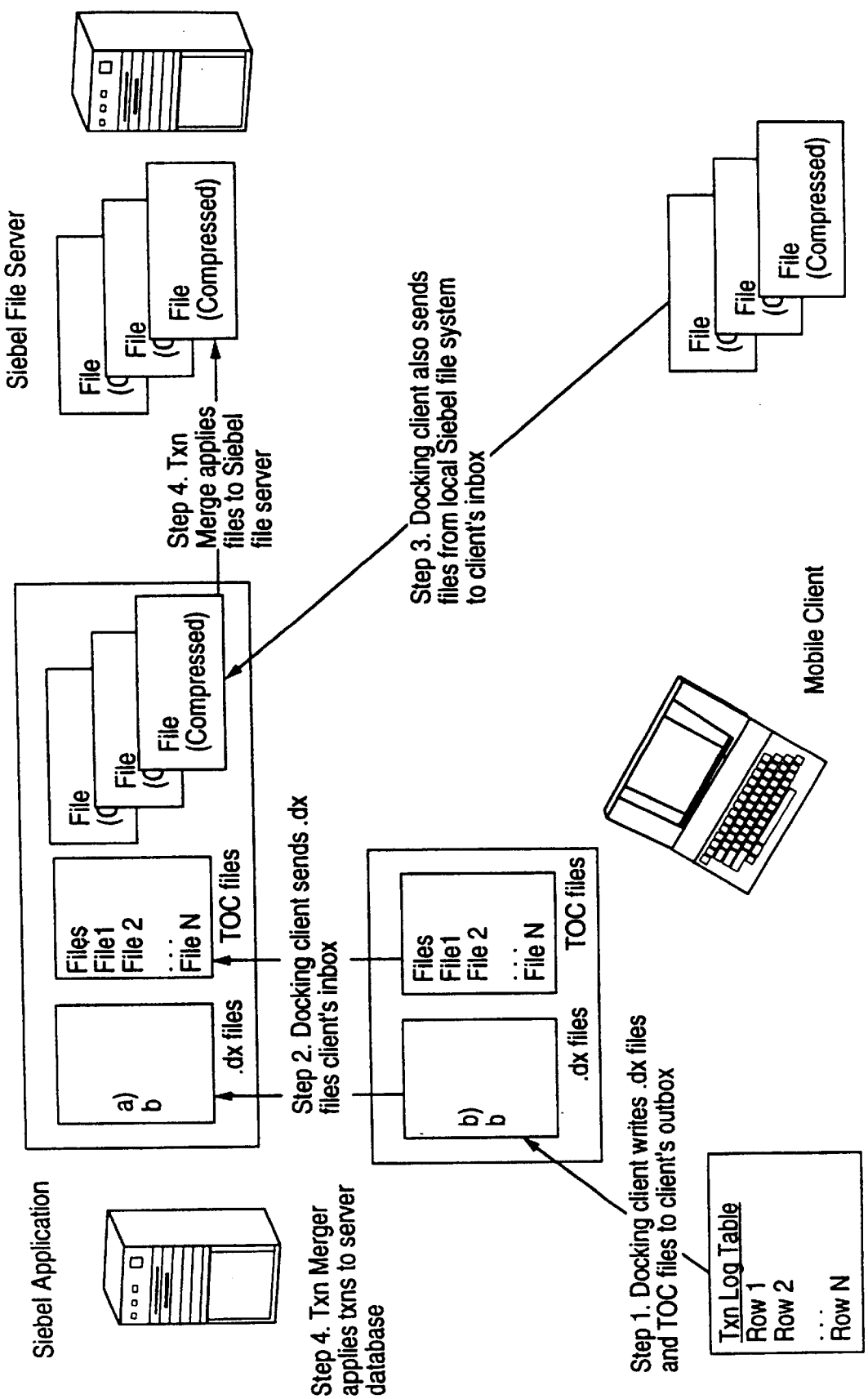

FIG. 5 illustrates sending and applying files and transactions from mobile clients. Here, a docking client writes files to the client's outbox, and sends the files to the client's inbox. The docking client also sends files from the local files system to the client's inbox. A merge function applies the files to the file server, and a transaction manager applies the transactions to the server database.

The database management system of the invention sends files with the file table rows:

When creating .dx files to send to the server, the docking client also creates a TOC file that lists the associated files. The TOC file contains a list of files that should be uploaded when the docking client transfers the .dx file to the server database. For each file, the TOC file lists the file name, file size, target directory, whether the mobile client can defer downloading the file, the file table name and the ROW_ID of the file table row.

When sending .dx files from a mobile client to a docking server, the docking client also sends the associated files for each .dx file. The docking client reads the TOC file associated with each .dx file to determine which associated files to send to the docking server. The docking server writes the associated files to the docking client's inbox directory.

The mobile user cannot defer sending of files to the docking server. The docking client always sends all associated files for each .dx file to the docking server.

When sending .dx files from a regional database to a docking server, the regional database also sends associated files for each .dx file.

Figure 6:
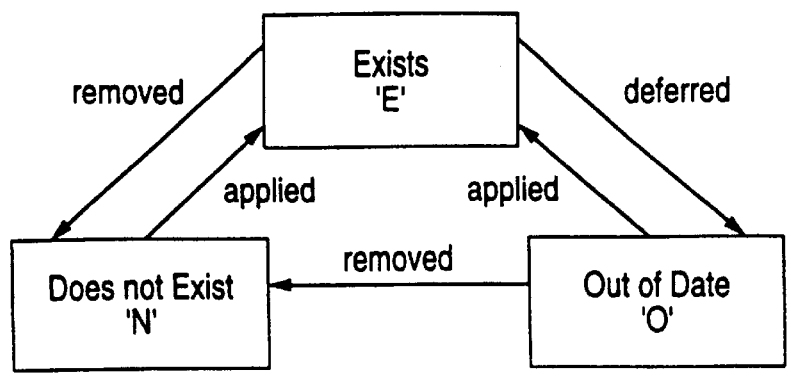
FIG. 6 is a state diagram for file dock status. It shows three states: Does Not Exist, Exists, and Out of Date, with the transitions between states.

FIG. 6 is a state diagram for file dock status. It shows three states: Does Not Exist, Exists, and Out of Date, with the transitions between states.

When applying transactions on file table rows, Data Merge applies the associated file by copying the file from the docking client's inbox directory to the target directory.

Data Merge updates the values of FILE_DOCK_STAT_FLG using these rules. Data Merge always sets the status to 'E' (file exists) on a server or regional database.

File successfully applied: Set the value to 'E' (file exists). If the File does not exist: If the file does not exist in the inbox directory, set the value to 'N'. If the file does exist in the local file system and the old value was 'E', set the value to 'O' (out of date). For files that were deferred and whose FILE_DEFER_FLG is set to 'P' (mobile clients should have the file), Data Merge automatically submits a request to retrieve the file in the next docking session. Data Merge does not submit requests for files that were deferred and whose FILE_DEFER_FLG is set to 'R' (mobile users must explicitly request the file).

FIG. 7 is a screen view of a specialized frame for file attachments according to one embodiment of our invention. The edit links are "Name", "Source", "Size", and "Time Stamp", and the actions are "Break Link", "Update from Source", and "Change Source", with "OK" and "Cancel".

Figure 8:
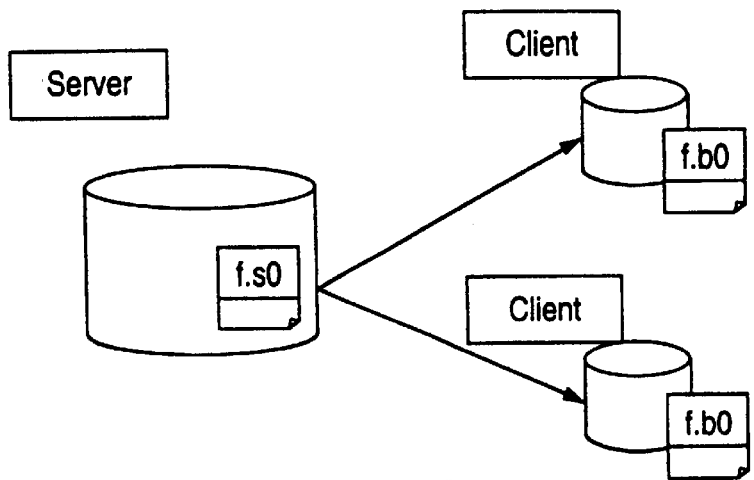
FIG. 8 shows an overview of file transfer and merging, with a representation of a server, having file f.s01, and clients A and B also with local replications of file f.b0.

FIG. 8 shows an overview of file transfer and merging, with a representation of a server, having file f.s01, and clients A and B also with local replications of file f.s01. Appendix 5 references FIG. 8 in detail.

Figure 9:
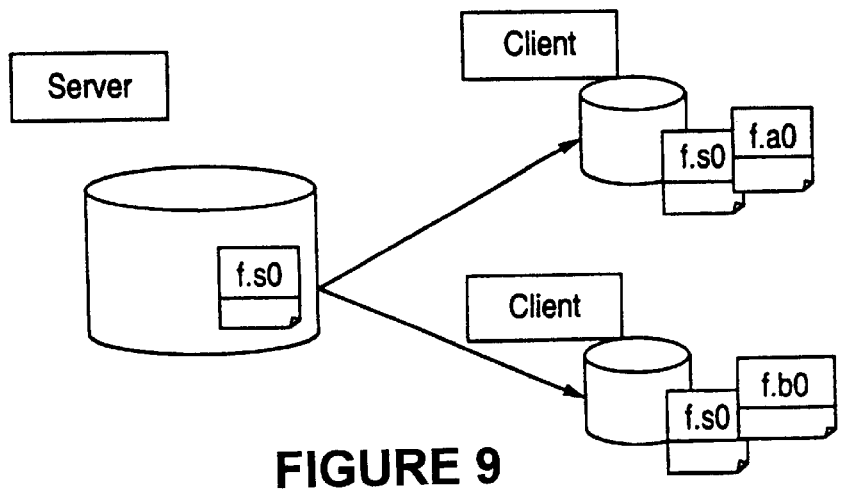
FIG. 9 shows an overview of the system of FIG. 8 where client A also has local file f.a0 and client B now has local file f.b0.

FIG. 9 shows an overview of the system of FIG. 8 where client A also has local file f.a0 and client B now has local file f.b0. Appendix 5 references FIG. 8 in detail.

Our invention is a method of managing a database, which has at least one database table having rows and columns. Each row of the database table corresponds to a database object, and each column corresponds to an attribute of the object. One of the attributes is a reference to a non-database object file.

In addition a non-database object file be, for example, URL addresses, text files, image files, sound files, executable files, or combinations thereof.

Nodes and users are allowed to create, delete, and update non-database objects in the central database.

In another aspect of the invention, distribution of a non-database object to a node may be deferred until the node chooses to receive the non-database object. As an example, mobile users can defer downloading of a non-database object to minimize connect time and save downloading until a future docking session.

One or more non-database object files can exist in the database and can be distributed to a node. A node can create, delete, and update the non-database object file in the central database. The distribution of these object files to a node can be deferred until the node chooses to receive the file.

Condition for a non-database object file can be specified, and the file is only distributed to a node if the condition is satisfied.

In addition, distribution of a non-database object file to a node may be controlled such that the non-database object file is only distributed to the node if the node requests the non-database object file and has visibility to the non-database object file.

Also, updates of a non-database object file are distributed to all nodes and partially replicated databases that have a copy of the file.

Rules can be set at a node for receiving a non-database object file at the node only if the file satisfies the rules set by the node.

A non-database object file may be broadcasted to a node even if the file does not satisfy rules set by the node, forcing the node to receive the file. A broadcasted non-database object file can also be distributed only to the nodes that have visibility to the file. A non-database object file can be made available to a node only by the request of the node. Also, distribution rules can be set for a file such that the file is only distributed to a node only if the distribution rules are satisfied. Examples of these rules include receiving files of only certain types or sizes.

A non-database file object can be a file attachment. A node can create, delete, and update a file attachment in the database.

Distribution of a file attachment to a node can be deferred until the node chooses to receive the file attachment.

One or more conditions for file attachment can be specified, and the file attachment is distributed to the node only if the conditions are satisfied.

In another embodiment of the invention, a file attachment can be distributed to a node only if the node requests the file attachment and has visibility to the file attachment.

Updates of a file attachment are distributed to all nodes and partially replicated databases that have a copy of the file attachment.

Rules at a node can be set for receiving a file attachment at the node only if the file attachment satisfies the rules set by the node.

A broadcast file attachment can be distributed to a node even if the file attachment does not satisfy rules set by the node, in effect forcing the node to receive the file attachment.

Distribution rules can be set for a file attachment, such that the file attachment is distributed to a node only if the distribution rules are satisfied.

End users can easily create, update and delete file attachments. This includes copying external files that are stored in, for example, a file system or web page. Moreover, the method, apparatus, system, and program product of our invention can automatically update the copy of the file from the original external file. One aspect of this capability is that users can readily configure file attachments on any business object including service requests, opportunities, quotes, agreements, and the like. End users can also create multiple versions of a file.

Moreover, file attachments are automatically replicated to docking clients. This allows different business objects to share the same copy of a file. For example, two service requests can share the same file; similarly, an opportunity and a service request can share the same file.

Another aspect of our invention provides a business object tool for users to register any file attachment. The business object supports file teams so that one user can register a file and add other users to the file team. All users on the file team can view the file. The file is automatically distributed to all users on the team.

The method, apparatus, system, and program product of our invention provide remote support for distribution of literature and correspondence templates or file attachments. This includes letting mobile users request literature, e.g., in the appropriate screen or menu, screen, downloading the requested literature in the next docking session, and distributing published literature and correspondence templates.

Another aspect of our invention is support for remote updating of file attachments. This is accomplished by empowering individual users to update files anywhere (i.e. while connected to the server database or a mobile client) and replicate the updated files to all docking clients that have visibility to the file. Docking resolves uniqueness and update conflicts among files to guarantee consistency across all databases.

The method, apparatus, system, and program product of our invention routes files to docking clients using visibility rules.

Moreover, the method, apparatus, system, and program product of our invention supports a robust set of visibility rules that determine which files are transferred to which nodes. These visibility rules include specifying all files of a certain type (e.g. published literature), user selected files (e.g. literature retrieval), files attached to a visible object (e.g. attachments to quotes, agreements, service requests and so on).

This is all accomplished while maintaining data integrity. The method, apparatus, system, and program product of our invention replicates files with their associated database transactions to guarantee transaction integrity on all docking clients.

Downloads may be deferred or on demand. For example, a mobile user may elect to defer file downloads in docking session so users can reduce the duration of a docking session. For example, restrict file downloads to a maximum size, certain file types, etc. Only mobile users can defer file downloads. Regional databases and server databases always get all files. Alternatively, a mobile user may elect to request files that were deferred. In the case of deferred downloads, the requested files are downloaded in the next docking session. Downloading requested files must be fast and not burden the server database. If a file is deferred (i.e. there is a row in the local database saying the file exists, but the actual file is not available on the mobile client), the mobile user requests the file (by clicking on something) and the file is delivered in the next docking session.

To reduce connect time and communications bandwidth, mobile users may defer downloading of selected files to minimize connect time. The mobile user specifies the files that he or she wants to defer by setting docking session preferences in a control file, for example, a file synchronize dialog box. For example, the mobile user may want to defer downloading files greater than 1 Ok. When the mobile user navigates to a screen that displays files, the client shows whether each file exists, the file does not exist or the file is out-of-date in the local file system. In addition, mobile users may request and download files that were previously deferred or are out-of-date. Thus, an up-to-date copy of the file is retrieved in the next docking session.

To further support mobile users, the method, apparatus, system, and program product of our invention lets mobile users delete requested files from the mobile client's local disk to minimize disk usage.

In a situation where there are many mobile users, there will necessarily be multiple client configurations. The method, apparatus, system, and program product of our invention supports file access from different data sources, for example, both connected users and a mobile user. The system, method, apparatus, and program product of our invention distributes files to regional databases as well as mobile clients. This includes routing the files up from docking clients to server databases and vice versa.

In these situations, the server differentiates between which files are available for downloading and which files are not.

The system, method, apparatus, and program product of our invention initializes files as well as data when extracting and initializing a docking client.

When a user creates a new file, the client function of our invention inserts a row in a table that stores information about files. These file tables store file information including the name, size, original source (e.g. the type and full path name of the source file) and docking statuses of the file. Developers and configurators must create a file table for each file attachment applet.

The client function also stores a copy of the file, with an internal name, in the file system. The data base management system may store each file in a compressed format to reduce disk usage. For connected users, the file system is a collection of directories on the file server, which is specified by a value in a file, as, for example, a configuration files. For mobile users, the file system typically resides on the mobile client's local disk, typically under a suitable directory, for example, a client installation directory.

When a user accesses a file, the client uncompresses (if compressed) and copies the file from the file system to a temporary directory and invokes the appropriate program to display and edit the file (e.g. Microsoft Word). If the user modifies the file, the client updates the file information in the file table and copies the modified file from the temporary directory to the file system.

File table rows and the associated files are replicated to docking clients that have visibility to the files. When the Transaction Router routes a file table row, it also writes information about the associated file to a suitable file. When a docking client sends or retrieves the transactions on file table rows, it also sends and retrieves the associated files for the file table row. When data merge applies file table rows to a database, it also copies the file to the local file system.

In a preferred exemplification, the system, method, apparatus, or program product of our invention replicates all associated files to regional databases.

From an application perspective, file usage is transparent. Files are part of Business Objects (like a Service Agreement, a Quote, or a Product). If a business object supports multiple files, it must have a file table to store multiple files for each instance of the business object.

The user can create a file using one of the following methods:
Copy an existing file registered in the data base by using a pick list or association list.
Create a new file by using drag and drop (including e-mail).
Create a new file by invoking the appropriate application (e.g. Microsoft Word).
Create a new file by using advanced template/merge functions including correspondence managers, or reporting functions.

The client copies the source file to the file system and creates a file table row for the new file.

The user can double click on a selected file to view and edit the file. The client invokes the appropriate program to read the file from the file system and display the file.

If the developer enables deletes, the user can delete an existing file. The client deletes the file from the file system.
Caching Files for Connected Users For users that have access to a file server, the client automatically copies files including file attachments from the file server to a local file cache on the user's local disk to improve file access performance. Note that connected users should always have access to a file server.

Mobile users usually access the local file system on the local disk but can choose to access a file server instead (e.g. using the internet). Whenever the user views a file, the client first tries to open the file from the local file cache before reading the file from the file server.

The user can manage the local file cache (similar to web browsers). The connected user can view a list of files that are currently cached on the local disk, control the maximum size of the cache and delete all files from the cache to recover local disk space.

The invention automatically replicates files including file attachments to all docking clients that have visibility to the file. The mobile user does not need to do anything to replicate the files and file attachments. The database management system of the invention copies the files and file attachments to a local file system on the docking client. For mobile clients, this local file system resides under the client root directory. For regional databases, the root directory of the local file system is specified using a suitable environment variable or function.

The invention lets mobile users defer downloading of specified files and file attachments to minimize connect time. The user can specify the type and number of files and file attachments to download in each docking session:

File size. The method, apparatus, system, and program product of our invention can be controlled to download files and file attachments only less than or greater than a certain size (e.g. files less than 10K in size).

File extension. The method, apparatus, system, and program product of our invention downloads files and file attachments only with or without certain extensions (e.g. Microsoft Word documents, bitmaps, JPEG files, MPEG files, text files, sound files, executable files, etc.).

File type. The method, apparatus, system, and program product invention downloads files and file attachments for certain business objects (e.g. files for Quotes but not files for Service Requests)

On mobile clients, the client displays the status of each file and its file attachments. This dock status indicates whether the file exists, the file is out-of-date, or the file does not exist on the local file system. If the file is out-of-date or does not exist, the mobile user can submit a request to retrieve a current copy of the file in the next docking session. The mobile user can specify whether the invention should retrieve all updates to the requested file to keep the file and its file attachments up-to-date. If the file or an attachment thereto exists or is out-of-date, the mobile user can remove the file from the local file system to reduce disk usage. The user can cancel a request before the next docking session.
Administrator Procedures The administrators need to provide a file server to store the file system. All connected users must have access to the file system. Users that can create, update and delete files must be able to read and write to the file system. Users that only need to view files need to have read access to the file system.

The file system must also be accessible to all application servers that route and receive transactions for docking clients. The server components—Docking Server, Transaction Merger, Transaction Router and Database Extract—must be able to read and write to the file system.

The System administrators can use the client to easily copy files in and out of the database. The client lets administrators use drag and drop to create a set of files in the server. The client also provides a button to update existing files from their links.
Developer Procedures Developers must create new tables store file attachments. Each file table should have a set of additional required columns to store information about each file attachment.

Developers must create new applets that use (or subclass) a specialized business component (and frame) which provides basic file functionality. The specialized business is component will be a combination of three procedures, ( ) CSSBCAttach, CSSBCFileReq, and CSSBCDockReq. It will be controlled by Business Component User Properties, so developers should not need to subclass it unless there are other special operations he needs to perform.

Developers then add the new applets to existing business objects to enable file attachments.

High Level Architecture

File System

The File System is a directory structure that stores referencing files registered in the server. This relates to files that can have a column entry referencing, calling, or pointing to a file attachment. All files are stored compressed and named with the file table row's ROW_ID value. There are several ways that the File system can be laid out:

Option 1: Flat Directories. In flat directories, all the referencing files are stored in a single directory. This is easy to implement, however, the operating system may impose limits on how many files can be stored in a single directory.

Option 2: Hash Files into Directories by File Type. In hashing, many directories are created in the file system: one directory for each file extension. When reading or writing a file in the file system, each program stores the file into the appropriate file type directory. In hashing, files are spread out among many directories. However, the files are unevenly distributed among directories.

Option 3: Hash Files into Directories by File Name. In hashing by file name many directories are created in the file system (e.g. 26 directories named a, b, c, z). When reading or writing a file in the file system, each program applies a hash function to the ROW_ID value and determines which directory (i.e. hash bucket) the file resides in. In hashing by file name, files are spread out among many directories: this circumvents any limits on the number of files in a directory. However, the disadvantage of hashing by file name is that the total number of files that can be stored is still finite (but 26 times more than a single flat directory).

Configuring and Using File Attachments

The method, apparatus, system, and program product of our invention provides an easy-to-use, easy-to-configure and standard user interface for attaching files to business objects.

To create business object specific tables to store files, developers create a file table for every business object that needs file attachments. For example, if Opportunities, Quotes and Service Agreements need file attachments, the developer creates three tables—S_OPTY_FILES_QUOTE_FILE and S_SRV_REQ_FILE.

Each file table has a set of columns (all with predefined names) to store information about a file:

File size. The size of the file in the file system.

File date. The date and time when the file was last updated in the file system.

File suffix. The suffix of the file (e.g. .doc for Microsoft Word documents, .txt for plain text files, etc.).

Internal directory name. The directory name of the file in the file system. This name is relative to the root directory of the file system.

Source file type. The type of the original file. For example, when users-copy a file from the operating system, from another file already registered in the database management system, or from a World Wide Web page. Users may also copy files from other data stores such as Documentum.

Source file name. The name of the original file. For operating system files, this stores the full pathname to the original file. For World Wide Web pages, this stores the URL of the web page. For files, this stores the internal name of the file and directory in the file system.

Defer flag. Indicates whether the file is broadcasted (mobile users must always download the file), file is published (mobile users should have the file but can defer downloading) or the file is requestable (whether mobile users must explicitly request the file). This flag only applies to mobile clients.

Request flag. Indicates whether a request to retrieve the file in the next session. This flag only applies to mobile clients.

Dock Status flag. Indicates whether the file exists, the file exists but is out-of-date or the file does not exist in the local file system. This flag only applies to mobile clients.

Auto update flag. Indicates whether the system should retrieve updates to the file. This flag only applies to mobile clients.

File Revision The revision of the file. The revision changes every time a user updates the file. Each revision is given a unique id to prevent two users from clobbering the same file.

Developers register file tables in the repository so the database management system of the invention knows that each row in these tables have an associated file. This is shown in Appendix 1.

Create database tables to store shared files.

The database management system of our invention utilizes a file business object to store any type of file. Customers can use this table to distribute files to users. The business object contains a file header, table to store file attributes and a team table to designate which users have access to the file. The business object has visibility rules to determine which mobile clients get which files. This is shown in Appendix 2.

A further aspect of our invention is screens to view and administer files in the business object. If a developer prefers to share files, he or she can create an intersection table from his business object to the file business object instead of creating his or her own file tables. For example, instead of creating an opportunity table to store files for each opportunity, the developer can create an intersection table, that associates an opportunity with a file in opportunity file table. The developer would also need to add visibility rules to the opportunity file table stating that an opportunity file row is visible if the file is used by an Opportunity that is visible to the mobile user. This is shown in Appendix 3.

A further aspect of our invention is the provision of consistent methods for users to create, maintain and view file attachments. This requires specialized frame and business components for manipulating file attachments. The specialized frame and business component lets users create, edit and delete file attachments and also has drag and drop support so users can drag files from the file managers and drop them into the database.

A user has several ways of creating new file attachments in the database:

Create a new file attachment from an "external" file. The user creates a new file by pointing to an existing file on the file system. In this way it is possible reference files in other locations such as Documentum, etc.

Create a new file attachment from an existing file or file attachment. The user creates a new file attachment by pointing to a file or file attachment that already exists in the database.

Create a new file attachment from scratch. The user creates a new file attachment by invoking a program (e.g. Microsoft Word) to create the file attachment. This may include inserting an object UI, e.g., as is done by Microsoft or a file browse dialog.

When a user creates a new file attachment, the database management system of the invention makes a copy of the original file attachment and stores the file attachment in the file system. The file system may store, and preferably does, store the file attachments compressed to reduce disk usage, and names the new file "<ROW_ID>extension where ROW_ID is the ROW_ID value of the file table row and extension is the original extension of the file. (e.g.doc for Microsoft Word documents).

The database management system of the invention may also store the full path name or source of the original file from which the file attachment is derived.

A further aspect of the invention is the ability to update file attachments that already exist in database management system of the invention. A specialized frame and business component provides an "Update Link" method that lets the user update the copy of the file attachment if the original file or file attachment is changed.

When a user views an existing file attachment, the database management system of the invention uncompresses and copies the file attachment from the file system to a temporary directory. The database management system of the invention then invokes the appropriate procedure or program to display and edit the file attachment. If the user modifies the file attachment, the database management system of the invention updates the file attachment information in the file table and copies the modified file attachment from the temporary directory to the file system.

When a user deletes a file table row, the database management system of the invention automatically deletes the file attachments referenced therein from the file system and deletes the file table row from the database.

The client automatically maintains a local file cache to improve file access performance. Whenever a user views a file and has access to a file server as shown in FIGURE i, the client first tries to open the file from the local file cache before reading the file from the file server. The user can manage the local file cache (similar to web browsers). The user can view a list of files that are currently cached on the local disk, control the maximum size of the cache and delete all files from the cache to recover local disk space.

To add the ability to manage files in a business object, developers or end-users may add a specialized frame and business component to the business object. Developers can subclass from the specialized frame and business component to add additional functionality.

FIG. 1 shows creating files for connected users. As there shown, a user creates a new file in the client screen. This file is compressed and copied to the file system and the local file cache. The file table row is then written, and the transaction logged to the database. An aspect of our invention shown in FIG. 1 is the implementation of changes to the configuration file to support Local File Cache.

Replicating Files

Basically, file attachments are attached to file table rows. Transactions for file table rows represent files that the data base management system of the invention needs to replicate. When sending and receiving transactions on file table rows, The invention also involves downloading the files they reference into the local inbox.

When applying (merging) the transactions to the mobile client, the database management system of the invention moves the files to their rightful place in the directory structure. If The invention does not apply the transaction (i.e. it is a conflict), then it removes the file from inbox without moving the files to the rightful place.

Since the current architecture downloads .dx files instead of transactions, the Transaction Router builds an auxiliary Table of Contents) TOC file for each .dx file. The TOC file lists the files that are referenced by its transactions. At the source, the TOC file contains references to the original file. At the destination, the TOC file contains references to temporary files stored in the inbox directory. The files in the TOC file are listed in the order that they are required by the file table row transactions in the .dx file. This is illustrated 'in Appendix 4.

This architecture, shown in Appendix 4, supports updates to file attachments (from the client or the server), as long as there is also an update to the corresponding file table row. These updates occur automatically if the file attachment is changed after invocation of the program from the Client. Alternatively, the directory structure can be scanned periodically, and updates can be generated if the file attachment appears to have been modified.

Adding the deferred download feature for mobile clients requires additional system functionality. The docking client must be able to filter out files that the mobile user wants to defer. The client must indicate to the user that some files do not exist or are out-of-date. Finally, the user must be able to get an up-to-date copy of missing or out-of-date files.

Letting Users Create, Update and Delete Files and File Attachments

Any user-mobile or connected-can create a new file attachment, update an existing file attachment or delete an existing file attachment in the database management system of the invention. The user can use the client to create, update or delete a file. Whenever the file attachment is changed, the client updates the file's attachments size and date, increments the number of times the file has been updated and logs an update transaction in the docking transaction log.

File attachment transfer, merging, and revision management are described in Appendix 5 and illustrated by FIGS. 8 and 9.

Route Files with Transactions on File Tables

The database management system of the invention replicates the new or updated file to all destinations. The database management system of the invention routes files with their associated file table rows. Each file table is associated with its own dock object and uses the visibility rules for the dock object. For example, if an Opportunity is visible to a docking client, the mobile user gets all the rows for that Opportunity, including the opportunity rows for the Opportunity. For example, if the mobile user is on the file team (i.e. S_FILE_POSTN), the mobile user gets the row in S_FILE. The S_FILE is described in Appendix 6.

When routing a file table row, The database management system of the invention writes the row to the .dx file and also writes information about the associated file to a TOC file for the .dx file. This TOC file contains a list of files that should be downloaded when the docking client transfers the .dx file to the remote database. For each file, the TOC file lists following information shown in Appendix 6.

On mobile clients, the docking client always sends updated files to the docking server. On regional databases, the Replication Agent always sends updated files to the docking server. On server databases, the Transaction Router routes the update transaction on the file table row, including the updated file, to the docking clients that have visibility to the Retrieve Files with Transactions.

When retrieving .dx files from a docking server to a mobile client, the docking client also retrieves the associated files for each .dx file. The docking client writes the associated files to the docking client's inbox directory using the internal name of the files (e.g. <ROW_ID>.<extension>). The docking client only retrieves the file if the file does not already exist in the inbox directory or has a different size or update date. This is described in Appendix 7, Redundant Transfer.

The docking client can defer downloading of certain files. The docking client reads the TOC file to determine which files to download and which files to defer.

The mobile user sets preferences for file downloads including file attachment downloads in the database management system of the invention.

In an Advanced dialog box the mobile user has several ways to specify which files and file attachments to defer:

For each business object, specify retrieve files flag: If the value is yes, the docking client retrieves files associated with this business object. However, if the value is no, the docking client defers all files associated with this business object, except if the row's defer flag is set to Yes.

For each business object, the user specifies maximum file size to retrieve files less than or equal to the maximum size. The database management system of the invention also provides additional criteria such as "retrieve all files with a certain extension," file name, etc. For each business object, the database management system of the invention specifies minimum visibility strength of the file table row's dock object instance. The database management system of the invention retrieves the file if the dock object instance is greater than or equal to the minimum visibility strength. The database management system of the invention does not retrieve the file if the dock object instance is less than the minimum visibility strength.

For each row in a file table, it is possible to use the defer flag. Thus, if the value is yes, the docking client can defer getting the file. But, if the value is no, the docking client must always retrieve this file, even if the user has specified not to retrieve files for this business object or files greater than the maximum size.

These options may be stored as a file on the docking client or in the local database, or, in a node type table that gets replicated to server database.

The Replication Agent always retrieves all files to ensure that all files on the regional database's file system are up-to-date. The Replication Agent cannot defer downloading of files to the regional database.

Send Files with Transactions

The database management system of the invention sends files with the file table rows:

When creating .dx files to send to the server, the docking client also creates a TOC file that lists the associated files. The TOC file contains a list of files that should be uploaded when the docking client transfers the .dx file to the server database. For each file, the TOC file lists the file name, file size, target directory, whether the mobile client can defer downloading the file, the file table name and the ROW_ID of the file table row.

When sending .dx files from a mobile client to a docking server, the docking client also sends the associated files for each .dx file. The docking client reads the TOC file associated with each .dx file to determine which associated files to send to the docking server. The docking server writes the associated files to the docking client's inbox directory.

The mobile user cannot defer sending of files to the docking server. The docking client always sends all associated files for each .dx file to the docking server.

When sending .dx files from a regional database to a docking server, the regional database also sends associated files for each .dx file.

Apply Files with Transactions

When applying transactions on file table rows, Data Merge applies the associated file by copying the file from the docking client's inbox directory to the target directory.

Data Merge updates the values of FILE_DOCK_STAT_FLG using these rules. Data Merge always sets the status to 'E' (file exists) on a server or regional database.

File successfully applied: Set the value to 'E' (file exists). If the File does not exist: If the file does not exist in the inbox directory, set the value to 'N'. For files that were deferred and whose FILE_DEFER_FLG is set to 'P' (mobile clients should have the file), Data Merge automatically submits a request to retrieve the file in the next docking session. Data Merge does not submit requests for files that were deferred and whose FIL_DEFER_FLG is set to 'R' (mobile users must explicitly request the file).

If an update conflict occurs on the file date column of a file table row, Data Merge applies the file if the incoming transaction wins the conflict. Data Merge does not apply the file and deletes the file from the inbox directory if the incoming transaction loses the conflict.

Because files are named "<ROW_ID>.<extension>", unique conflicts cannot occur on the file names.

Let Users Request, Retrieve and Remove Deferred Files

Mobile users can submit requests for the database management system of the invention to retrieve non-existent or out of date files in the next docking session. Note that this applies only for users of mobile clients. This does not apply to connected users or users of a regional database.

The mobile user uses the client to request the file. The client inserts a row into the docking request queue table (i.e. S_DCK_REQ_ITEM).

The docking client processes docking requests in the next docking session in which file retrieval is enabled. The docking client reads each row in the docking request queue table. The docking client retrieves the file from the docking server and copies the retrieved file to the target directory. The docking client updates the DOCK_STAT_FLG to 'E' (file exists), deletes the row from the docking request table and commits the changes to the local database.

The mobile user can also specify whether the database management system of the invention should retrieve all updates to the requested file to keep the file up-to-date. If so, the database management system of the invention retrieves updates to the files. If not, The database management system of the invention retrieves a copy of the file in the next docking session but does not retrieve updates to the file. This is described in Appendix 8.

Mobile users can remove a file from the local computer to reduce disk usage. The mobile user uses the client to remove the file. The lient deletes the file from the local disk and updates the DOCK_STAT_FLG to 'N' (file does not exist). If the user wants to view the file again, the user can explicitly request the database management system of the invention to retrieve the file in the next docking session.

Extract Files with Transactions on File Tables

Database Extract extracts files with their associated file table rows. When database extract writes a file table row to the snapshot file, it also writes information about the associated files to a TOC file for the snapshot file. This TOC file has the same format as the TOC files for .dx files. It contains a list of files that should be downloaded when the docking client retrieves the snapshot file. For each file, the TOC file lists the file name, file size, target directory, whether the mobile client can defer downloading the file (i.e. the defer flag), the name of the file table and the ROW_ID of the file table row. 5 When retrieving the snapshot file for mobile clients, the docking client also retrieves the TOC file to the docking client's directory. The docking client can defer downloading of certain files. The docking client reads the TOC file to determine which files to download and which files to defer. The docking client uses preferences for file downloads in, for 0 example, an Advanced dialog box.

Before creating the local database, a Database Initialization procedure deletes all files from the local file system. After creating and loading data into the local database, the Database Initialization procedure reads the TOC file in the inbox directory and applies ~. 5 each file to the local file system. The Database Initialization procedure updates the values of FILE_DOCK_STAT_FLG using the same rules as Data Merge. Downloading File Attachments for DBINIT as shown in Appendix 9.

The Replication Agent always retrieves all files to ensure that all files on the regional database's file system are up-to-date. The Replication Agent cannot defer downloading of files to the regional database.

Standard File Attachment Applet

In one embodiment of our invention the specialized frame and business component provides the following fields that the developer can expose on the file attachment applet:

File size. Shows the file size in bytes. This field is read-only and is maintained by the specialized frame and business component system of the invention maintains. For connected users, indicates whether the file exists in the local file cache. This field is read-only and is maintained by the database management system of the invention.

In a particularly preferred embodiment of the invention, a specialized frame and business component provides the following built-in actions:

Create a file in the database an existing operating system file. Pop up the standard file dialog box and let the user specify one or more files to create. The specialized frame and business component create a new file table row and copies the operating system file to the file system. The frame and business component also stores the file size, file date, internal file name and full path name of the original file in the file table row.

Create a file in the database management system of the invention using drag and drop. In response to a drag and drop request, the specialized frame and business component creates a new file table row and copies the operating system file to the file system. It also stores the file size, file date, internal file name and full path name of the original file in the file table row.

Copy a file from an existing file in The database management system of the invention. Pop up a dialog box to let the user specify one or more files to copy. The specialized frame and business component creates a new file table row and copies the file to the file system. It also stores the file size, file date, internal file name and ROW_ID and table name of the original file in the file table row.

Update file from source. Update the copy of the file in the file system from the original file. If the file was created from an operating system file, then copy the operating system file again to the file system. If the user created the file by copying another file, then copy the source file again to the file system.

If the user created the file by copying a World Wide Web page, then download the web page again to the file system. Update the file size and file table in the file table row.

Break link. Delete the information about the source file so the file can never be updated from the original file.

Delete file. Delete the file from the file system. This happens automatically when the user deletes a file table row.

Invoke program. Invoke the program to display and edit the file. For connected users, the client first verifies that the file exists in the local file cache and is up-to-date (i.e. compare the dates and sizes) and copies the file from the file system to the local file cache. For mobile users, the client reads the file from the local file system that the database management system of the invention maintains.

The client uncompresses and copies the file to the temp directory (C:\temp) with the original name of the file (i.e. source file name) and then invokes the program to display and edit the temporary file. By using the source file name, the program (e.g. Microsoft Word) can show a meaningful file name to the user.

After the user closes the program, the client copies the temporary file back to the file system. The Client also updates the file size and file date in the file table row.

Request a file. Only available for mobile users. If a file has dock status 'O' (file out of date) or 'N' (file does not exist), submit a request to retrieve the file in the next docking session. The specialized business component and frame insert a row into the S_DCK_REQ_ITEM table with the ROW_ID and table name of the file table row.

File Screen

The File screen has three views:

Visible List. Show all files where you are on the file team. You can double-click on the row and the client lets the user edit the file.

System Administration List. Show all files in the file table. You can double-click on the row and the client lets the user edit the file.

Read only Visible List. Show all files where the individual user is on the file team. The user cannot edit the files using this view.

A further exemplification of our invention is a system having a headquarters ("HQ") database, a central or master database or collection of databases. Databases are arranged in a hierarchy to fully or partially replicate the HQ database into nodes, with full or partial copies of objects from the HQ database. The hierarchy can be extended such that a node can itself have full or partial replicas. Users can modify these databases, the objects that they contain, the attributes of these objects, and the values of the attributes, and the modifications are grouped within self-consistent units of work, or "transactions." Effects of the transactions are propagated automatically from the nodes to the HQ database, and from the HQ database to the nodes, in a "synchronization" process.

A further aspect of our invention is a synchronization process that takes information describing a set of transactions applied at a node and sends it to the HQ database, and it takes information describing the set of transactions applied at the HQ DB and send it to the nodes to "route" transactions. The synchronization process applies routed transaction information from a node to the HQ DB, and applies routed transaction information from the HQ DB to the nodes to "merge" transactions. An effect of merging is to bring about consistency, where a state or some subset of the state of one database, including its objects, a set of attributes for those objects, and values of those attributes, is substantially identical to the state or some subset of the state of the database from which the merged transactions is derived. The process of propagating transactions from one database to another may lag behind the process which applies work to a local database, and the databases differ by the state of some transactions that have not yet propagated.

A further aspect of our invention is a merging process that automatically resolves conflicts based upon "conflict resolution" rules. When two or more replicas of a database have transactions on copies of the same database object or set of objects, and the modifications of the object or set of objects affect the same attribute or set of attributes, and the attributes of the object or set of objects were previously consistent, then the merging process applies the transaction from one replica and does not apply the transaction from the other replicas.

The synchronization process routes transactions automatically based upon routing rules, and these routing rules examine the set of objects modified in a transaction, the set of attributes that are modified, the values of those attributes before and after the modification, and the nature of the modifications, in addition to other elements, and determine whether a particular node should receive the entire transaction, or some consistent subset of the information of transaction. In a preferred exemplification, the routing rules restrict the amount of information stored in a replica, for reasons including but not limited to security, reduction of information storage, and efficiency of merging. In another preferred exemplification, the routing rules also restrict information in a replica to, the set of information visible to a particular user or set of users, or visible to users of a particular region or set of regions, or visible to users of a particular division or set of divisions.

In a further exemplification of the invention, a database object has attributes whose values are references to file attachments, objects not contained within the database. These objects include but are not limited to data or program files maintained by the local node, sound, image and other files, and resources stored locally or remotely, as described by a Universal Resource Locator ("URL"). Maintenance and modification of the non-database objects uses specialized procedures, methods, or apparatuses, independent of the procedures, methods, or apparatuses used to maintain the objects in a database and used to modify the database objects, attributes of the database objects, and values of the attributes.

In another exemplification of our invention, file attachment references are contained as values of attributes of database objects, and standard routing and conflict-resolution rules for transactions control propagation of the references during synchronization. The file attachment references maintain and modify non-database objects via linkage to specialized procedures, methods, or apparatuses specific to the file attachment, and creation and deletion of these references invoke the procedures, methods, or apparatuses. Modification of a file attachment causes creation of a new version or revision of the non-database object, and revision information sufficient to distinguish one version of a file attachment object from previous or subsequent versions are stored as additional attributes or values of attributes as part of the file attachment reference in the database.

In another aspect of our invention, versions or revisions of file attachments maintain transaction semantics when the database file attachment reference modifies a non-database object is modified. When multiple users concurrently modify the same file attachment object, each user sees the user's own version. When a transaction is committed, a database user sees the appropriate revision of the file attachment that is associated with the committed transaction.

In another aspect of our invention, certain non-database objects, including data and program files maintained by a local node or database, are copied from one node or database to another during synchronization to ensure that the database file attachment reference provides access to an appropriate revision of the file attachment. Certain file attachment references allow an associated revision of the non-database object to become inconsistent with version information contained within the reference. Since a copy of the attachment may be deferred to a later synchronization or indefinitely, file attachments with this property are "deferrable." The deferrable property is indicated by a "defer flag" stored as attributes or values of attributes of the file attachment reference in the database. Values of the defer flag are include but are not limited to, "Broadcast" or "non-deferable," where a file attachment reference guarantees that an appropriate revision of the non-database object is always accessible, "Publish", where the file attachment reference guarantees that some revision of the non-database object is accessible, and "Request", where no revision of the file attachment need be accessible but that some revision may be retrieved during a later synchronization by user request.

While our invention has been described with respect to certain preferred embodiments and exemplifications, it is not intended to limit the scope of the invention thereby, but solely by the claims appended hereto.

APPENDICES

Appendix 1
Standard Columns in File Tables

All file tables must have the columns below in addition to any business object specific columns. The invention looks for these columns in a file table to identify the location, name and status of a file.

| Column Name | Type | Constraints | Comments |
|---|---|---|---|
| FILE_EXT | VARCHAR (10) | not null | Operating system name of the file. This does not include the directory path. |
| FILE_SRC_TYPE | VARCHAR (30) | | The type of the original file. This can be a "FILE", "web", " ", "Documentum" and so on. |
| FILE_SRC_PATH | VARCHAR (255) | | The path name of the original file. For operating system files, this is the full path name of the operating system file. For files, this is the relative path to the file in the file system. For world wide web pages, this is the URL of the web page. |
| FILE_SIZE | NUMBER (1,0,0) | not null | Size of the file in bytes |
| FILE_DATE | DATE | Not null | Date and time the file was last updated |
| FILE_REV_NUM | VARCHAR (15) | | Revision for the file |
| FILE_DEFER_FLG | CHAR(1) | not null | 'B'- File is broadcasted and is not deferrable: The invention must always replicate this file to all mobile users when replicating this row. 'P'- File is published. It is deferrable but should be retrieved if possible. 'R' - File is deferrable and should only be retrieved when requested by the mobile user. |

-continued

| Column Name | Type | Constraints | Comments |
|---|---|---|---|
| FILE_AUTO_UPD_FLG | CHAR(1) | | 'Y' - Always download and apply updates to this file if the file is defferrable and a local copy of the file exists (i.e. the mobile user has requested the file) 'N' - Do not download and apply updates to the file. Dock status will change to 'O' (out of date) if the file is updated on a remote database. |
| FILE_DOCK_REQ_FLG | CHAR(1) | | 'Y' - Row exists in the S_DOCK_REQ_REF table to retrieve the file in the next The invention session. 'N' - Row does not exist in the S_DOCK_REQ_REF. |
| FILE_DOCK_STAT_FLG | CHAR(1) | | The invention uses this column to denote the status of a file in the current database. The dbms of our invention does NOT replicate this column. 'E' - the file exists in accessible when connected to the current database. 'N' - the file does not exist when connected to the current database. 'O' - the local copy of the file is out of date and an updated version of the file exists. Business Object Specific Columns |
| CDROM_NAME | VARCHAR(250) | | |
| VOLUME_NAME | VARCHAR(15) | | |

Appendix 2

S_FILE

This table stores information about files for the File business object.

| Column Name | Type | Constraints | Comments |
|---|---|---|---|
| ROW_ID | VARCHAR(15) | not null Primary | |
| CREATED | DATE | no null | |
| CREATED_BY | VARCHAR(15) | not null | |
| LAST_UPD | DATE | not null | |
| LAST_UPD_BY | VARCHAR(15) | no null | |
| MODIFICATION_NUM | NUMBER | not null | |
| CONFLICT_ID | VARCHAR(15) | not null | |
| NAME | VARCHAR(75) | not null | User friendly name of the file |
| DESC_TEXT | VARCHAR(255) | | Comments for the file |

-continued

| Column Name | Type | Constraints | Comments |
|---|---|---|---|
| ENTERPRISE_FLG | CHAR(1) | | 'Y' - enterprise visible file 'N' - only visible to team members |
| PUBLISH_FLG | CHAR(1) | | 'Y' - push file to mobile users. I think we should replace this with a priority (High, Medium, Low, etc. |
| PUBLISH_DT | DATE | | |
| CDROM_NAME | VARCHAR(250) | | |
| VOLUME_NAME | VARCHAR(15) | | |
| DESC_TEXT | VARCHAR(255) | | Comments for the file |
| START_DT | DATE | | Start date when file can be viewed and edited |
| END_DT | DATE | | End date when file can be viewed and edited |
| FILE_TYPE | VARCHAR(30) | | Used for spawning the 3rd party executable to view and edit the file. Also to denote correspondence template or literature file. |
| DIR_NAME | VARCHAR(255) | not null | Directory path for the file relative to the root directory of the file system |
| FILE_EXT | VARCHAR(10) | not null | Operating system name of the file. This does not include the directory path. |
| FILE_SRC_TYPE | VARCHAR(30) | | The type of the original file. This can be "FILE", "web", "", "Documentum". |
| FILE_SRC_PATH | VARCHAR(255) | | The path name of the original file. For operating system files, this is the full path name of the operating system file. For files, this is the relative path to the file in the file system. For world wide web pages, this is the URL of the web page. |
| FILE_SIZE | NUMBER(10,0) | not null | Size of the file in bytes |
| FILE_DATE | DATE | Not null | Date and time the file was last updated |
| FILE_REV_NUM | VARCHAR(15) | | Revision for the file |
| FILE_DEFER_FLG | CHAR(1) | not null | 'B' - File is broadcast and is not deferrable: The invention must always replicate this file to all mobile users when replicating this row. 'P' - File is publised. It is deferrable but should be retrieved if possible 'R' - File is deferrable and should only be retrieved when requested by the mobile user. |

-continued

| Column Name | Type | Constraints | Comments |
|---|---|---|---|
| FILE_AUTO_UPD_FLG | CHAR(1) | not null | 'Y' - Always download and apply updates to this file if the file is defferable and a local copy of the file exists (i.e. the mobile user has requested the file) 'N' - Do not download and apply updates to the file. Dock status will change to 'O' (out of date) if the file is updated on a remot database. |
| FILE_DOCK_REQ_FLG | CHAR(1) | | 'Y' - Row exists in the S_DOCK_REQ_REF table to retrieve the file in the next The invention session. 'N' - Row does not exist in the S_DOCK_REQ_REF. |
| FILE_DOCK_STAT_FLG | CHAR(1) | | The invention uses this column to denote the status of a file in the current database, the invention does NOT replicate this column. 'E' - the file exists in accessible when connected to the current database. 'N' - the file does not exist when connected to the current database. 'O' - the local copy of the file is out of date and an updated version of the file exists. |

Appendix 3

S_TABLE (new column)

Add a new column to indicate whether a table is a file table. The invention uses this attribute for replicating file attachments.

| Column Name | Type | Constraints | Comments |
|---|---|---|---|
| FILE_TBL_FLG_ | CHAR(1) | | 'Y' or NULL- the table is a file table 'N' - the table is not a file table |

Appendix 4

Table of Contents Files for Routing File Attachments

In the architecture of the system, method, apparatus, and program product of the invention, a Transaction Router extracts transactions that are visible for a remote user and aggregates them in transaction (DX) files on the server. This document describes a design where the transaction router creates an auxiliary file called a Table of Contents (TOC) file that lists the file attachments referenced by the transactions stored in the DX file. The Docking Client retrieves the TOC file from server upon docking, and then the client retrieves the associated attachments listed in the TOC file. In addition, the client may send transactions with attachments to the server, and the Transaction Merger must apply the files associated with the transactions.

The docking request layer must support the following:

Determine if a DX file has an associated TOC file. Inform the docking client of the existence of the TOC file when the associated DX file is opened. Transfer the TOC file to the client upon request. Transfer the file attachments to the client or server upon request and preserve file meta-data (e.g. creation date, modification date, file owner) if possible.

TOC Routines

The server and client facilities that use TOC information are able to access the TOC file using the following routines.

DXTOCHandle

Input: Full DX or Snapshot Filename (with path and extension), Read or Write (/Append) flags, pointer to dictionary Returns: File handle DXTOCFileOpen Input: None-uses intialization parameters from handle creation.

Returns: error status

Open a TOC file for reading or writing.

DXTOCFileClose

Input: File handle

Returns: error status

Close a TOC file

DXTOCRead

Input: TOC file entry pointer

Returns: error status

Read a single file attachment entry from a TOC file and write it to the supplied TOC file entry structure.

DXTOCWrite

Input: TOC file entry pointer

Returns: error status

Write a single file attachment entry to a TOC file.

Transaction Router

When the transaction router writes a file table row to a DX file, it writes the information about the associated file to the TOC file. If the TOC file does not exist, then one is created. The TOC file has the same number as the DX file, but it has a TOC extension.

DRL and Client Download

The Docking Request Layer FileOpen method takes a new parameter to specify whether a numbered file is a DX file or a TOC, and this method must indicate whether a DX file has an associated TOC. After the client downloads a TOC file from the server, it reads the TOC to discover which file attachments must be downloaded.

Transaction Merger and Client Upload

When the docking client is extracting transactions to a DX file, it also creates a TOC file. However, the client does not upload its TOC file to the server. Instead, upon docking, it uses the TOC file to determine what files to transfer, and the client transfers those files directly. As the transaction merger applies the client transactions to the server database, it moves the associated files from the inbox to file system.

TOC File Implementation

Data Structures

DXTOCRead and DXTOCWrite use the following TOC Entry structure. struct DXTOCEntry

```
{
    CHAR szFileName[DB_MAX_FILENAME_LEN+I];    //file name
    LONG FileSize:                              //file size
    CHAR szDateTime[DB_MAX_DATETIME_LEN+I]     //modification
date of file
    //0 - file is not deferrable
    //1 - file is deferrable but should be retrieved if possible
    //2 - file is deferrable and should only be retrieved
    when requested by user
        CHAR DeferDownload[2];                  //if client can
    defer download
        CHAR szFileTable[DB_MAX_TBL_NAME_LEN+1]; //name of the file
        table
        CHAR szRowId[DB_MAX_ROWID LEN+1];       //rowid of file table
        row
        //Visiblity Strength of the dock object instance of which the
        //file table row is part.
        CHAR szVisStrength[DB_MAX_VISSTRENGTH_LEN+1];
}
```

TOC File Layout

The TOC File is written in plain text configuration file format. The TOC routines will be built out of primitives from common\os\utlcfg.h. Each TOC entry is written as a separate section, where the section name identifies the position of the attachment in the DX file (File1, File2, etc.), and the other fields are written as key/value pairs. A sample entry for a couple of files follows:

[FILE 2]
szFileName=Current Quote.rtf
FileSize=2189
szDateTime=197-09-26 19:13:31
DeferDownload=Y
szFileTable=S LIT
szRowId=10-SMIK
szVisStrength=0
[FILE 3]
szFileName=hostname.txt
FileSize=41
szDateTime=1997-09-26 19:13:35
DeferDownload=Y szFileTable=S LIT
szRowId=10-SMIL
szVisStrength=0

TOC File Routines

In addition to the basic routines described in the overview, the CDXTOC module acts as a C wrapper for the DXTOC class, and a couple of additional routines are provided:

CDXTOCWriteOper

Input: Encapsulated DXTOC handle, UTLDLog Dockoper pointer Returns: error status During Transaction Routing, write a single file attachment entry to a TOC file (and open the TOC file if necessary). The dockoper 'is examined—if it is an update or insert transaction on a file table that modifies the FILE DATE column the a TOC file entry is written. The Transaction Router calls this function after UTLDLogFileWriteOper in various places, ego LRT-Main.

CDXTOCDataFileCb

Input: UTLData Callback context and various arguments Returns: BOOL error status During DBXTRACT, write file attachment entries to a TOC file (and open the TOC file if necessary) for all files listed in a file table when that table is exported. This function is a callback for UTLDataExportSql.

DRL and Client Download

The Docking Request Layer FileOpen method takes a new parameter of type DRLFileExtension to specify the extension for numbered files, defined as:

```
//Legal Extensions for numbered files
enum DRLFileExtension

{
    DRLFXUnSpecified       = 0,
    DRLFXSnapshot          = 1,   // SNP
    DRLFXTableOfContents   = 2,   // TOC
    DRLFXTransaction       = 3    // DX
};
```

In addition, this method takes an extra boolean output parameter to indicate whether a DX or snapshot file being opened has an associated TOC file.

Opening a TOC file and downloading it to the client is identical to the procedure for downloading a DX file, with the exception of the specification of DRLFXTableOfContents versus DRLFXTransaction. When the client downloads a file attachment, it uses the file name version of the FileOpen method:

```
//specify complete input and output file names
//(ie name.extension, no path)
int FileOpen(DRLFileTransfer TransferType,
    BOOL bContinueTransfer, LONG SeekTo,
    CHAR* szInputFileName,
    CHAR* szOutputFileName,
    int* FileHandle, LONG*FileSize);
```

Using the rowid and extension values from the TOC file, the input file name is of the form <ROWID>.<REVISION>, and the output file name is the same.

Finally, the file attachment modification date should match the original modification date on the server.

[Note: Need OSD]

Appendix 5

Instead of storing files as <ROWID>.<extension>, the latest design gives every revision of every file everywhere a unique name <ROWID>.<REVISION>, where the revision is another, globally-unique rowid. For example, the file "foo.bar" on the server could be assigned the unique name f.s01, and it would get copied to Client A and Client B with this name, as shown in FIG. 8, which provides an overview of file transfer and merging.

When Client A and Client B create new revisions of "foo.bar", each one gets a globally-unique name. On Client A the new revision is stored as f.a01, and on Client B the new revision is stored as f.b01. If Client A docks with the server, the file f.a01 is routed to the client inbox on the server, as shown in FIG. 9. ;When the Transaction Merger applies the transaction, it will see that the FILE_DATE column has been modified for file "foo.bar" For this particular transaction, the update will show that Client A has an old value of f.s01 and a new value of f.a01. The actual value on the server is f.s01, so there is no conflict. The merge proceeds as follows:

1. The old value f.s01 is saved in a list in the merger.
2. The row in the database is updated with the new values (but not committed yet), including the new revision a01. Note that on a system with consistent read, other readers will still see the old revision s01 and reference the correct file.
3. If the file f.a01 is not on the server file system, then the file is moved from the inbox to the file system. Several points to consider here:

We can safely move a file from the inbox to the file system because every file has a globally-unique name. No other client could have or can generate the same name as f.a01 in the past, present or future, so we cannot overwrite a file accidentally.

We now have two copies of the file in the file system. However, with consistent read, readers will still see the old file.

If the system crashes after the move and before the current transaction is committed, then the transaction will be re-merged upon recovery. When the merger gets the step 3, it will discover that f.a01 is already in the file system, so it doesn't need to perform the move.

If the move fails and the file is lost, there is still a copy of f.a01 on Client A. The merger should rollback the current transaction and reset the RECEIVE value in S_DOCK_STATUS so Client A resends the DX file and its associated file attachments.

If the file is lost and the system crashed, upon recovery, the merger will re-merge the current transaction and discover that the file is not in the inbox or in the file system. At that point, it should roolback the transaction and reset RECEIVE to force the client to resend the file. If the system crashes during the move and corrupts the file, the merger could still detect this problem if it performs an additional check of the FILE_SIZE column versus the actual file size.
4. If the move is successful, the merger logs a transaction and commits. When readers re-query the file table row that references "foo.bar", they will see the new revision.
5. After the commit, the merger can safely delete the old file f.s01. If the system crashes before the delete but after the commit, we lose the information about old files on the delete list. At worst, some outdated revisions of the file will waste space on the file server. With some small effort we could construct a clean-up program that tracks down all unreferenced files on the server and deletes them.

If Client B docks with the server after Client A, it routes the file f.b01 is routed to the client inbox on the server. When the Transaction Merger applies the transaction, it will see that the FILE_DATE column has been modified for file "foo.bar". For this particular transaction, the update will show that Client B has an old value of f.s01 and a new value of f.b01. But now, the actual value on the server is f.a01, so there is a conflict. If the rule is the default that "server wins", then the transaction cannot be applied, and the file f.b01 is deleted from the inbox.

Deleting Old Revisions of Files

A major issue with the "aggressive" deletion policy proposed in the previous section is that TOC file entries for old files will be invalidated. In the previous example, where the old file f.s01 is deleted, it could have been referenced in the TOC file for a third docking client that has not docked yet. In addition, a change in visibility rules could mean that this other client should never see the revision f.a01 from Client A, so only revision f.s01 could be routed to this client. Some alternate revision control policies are listed.

1. One method: keep old revisions of all files, and periodically purge them by date (e.g. all unreferenced revisions of files older than one week are deleted) or by maximum number (delete the oldest unreferenced revision of a file when the revision count exceeds a certain number). If the purging period is slightly larger than the average docking interval, then a docking client should find the correct revision of a file with high probability.
2. Exact file method: delete aggressively, and deal with the fact that the merger may not find revision associated with the transaction.
3. Get Latest Always: docking client always find the latest revision of a file on the server. This approach eliminates the redundant downloading of multiple revisions of the same file, when the client is likely to apply all the transactions and only need the final revision. However, since the client receives routed transactions that are slightly older than the current server database, the final revision of the file in the dx file might always be older than the latest revision, so the client would never have a valid revision. In addition, a change to visibility rules might mean that the client should never see this revision.
4. Combination: for example, try to get exact file, and if it is not on the server, then see if the client has an old revision, else get the latest from the server.

A docking client can use some additional alternate deletion mechanisms. Because a client route every transaction (and every file attachment) to the server, the client can move an old revision o f the file from the file system to its outbox. When the client sees that the server has processed a DX file (via A DOCK STATUS), it can delete all of the file revisions in its outbox listed in the associated TOC file, then delete the TOC file and the DX file. Note that the client may end up moving the initial revision of a file to its outbox, and the initial revision does not get routed back to the server. However, the initial revision is listed in the TOC file for the snapshot, so if the client keeps the snapshot TOC file, it can always delete revisions listed in this TOC file from the outbox. When the client re-initializes its database, it should always delete the complete contents of the outbox.

Merging File Attachments

Whether file attachments are propagated via standard transaction routing, dbextract/dbinit, or upgrade, they need to be applied in a common, consistent manner. For every row that is merged, the merge process must examine the row and determine if it comes from a file table. If the row does come from a file table, the merge process must check the FILE_REV_NUM column and see if the value has changed. If the FILE_$REV$_NUM column has changed, the merge process must find the file attachment in the inbox and attempt to apply it to the database. Every revision of a file attachment is uniquely identified with a name of the form <ROWID>.<FILE REV NUM>. Every version of the file has the same, common ROWID prefix, with a distinct FILE_REV_NUM suffix. The general behavior of the merge is to search for the exact file revision in the INBOX and to apply the file and update the database according to the file attachment type. The type, stored in FILE_DEFER_FLG, is Broadcast, Published, or Request.

Case 1: Found Exact Revision in Inbox
For all types B, P, and R:
1. Move the file from the inbox to the file directory. If there is an older revision of the file in the file directory and the file is deferrable (P or R), the queue the old revision for deletion after the transaction commits.
2. Set FILE_DOCK_STAT_FLG=Exists
3. Set FILE_DOCK_REQ_FLG=No and delete any pending request in S DOCK REQ REF.

If the exact revision of the file is not found in the inbox, the merger should search for it in the file directory to see if it had been moved there previously. If the exact revision is already in the file directory, then the merger need only execute steps 2 and 3 of Case 1.

If the merger cannot locate the exact revision, it should look for any revision of the file in the INBOX.
Case 2: Found Any Revision in Inbox
For type B;
Return an error. Broadcast files must have an exact match.
For types P and R:
1. Move the file from the inbox to the file directory If there is an older revision of the file in the file and the file is deferrable (P or R), the queue the old revision for deletion.
2. Set FILE_DOCK_STAT_FLG=Out Of Date If the customer has set a preference to automatically retrieve new revisions of the file, and the file has not been requested yet, then insert a request to get the file.
3. If FILE_AUTO_UPD_FLG=True
   If FILE_DOCK_REQ_FLG=No
      Set FILE_DOCK_REQ_=Yes
      Insert a row into S_DOCK_REQ_REF
   Else // no auto update
      Set FILE_DOCK_REQ_FLG=No and delete any pending request in S_$_{DOCK\_}$REQ_REF.

If no revision of the file is found in the inbox, the merger should search for any revision in the file directory. If any revision is already inn the file directory, then the merger need only execute steps 2 and 3 of Case 2. If the merger cannot locate the any revision, it should perform one of the following actions in Case 3.
3: No Revision found anywhere
Type B:
Return an error. Broadcast files must have an exact match.
Type P:
1. Set FILE_DOCK_STAT_FLG=Not Exists If the file is published and it has not been requested yet, then insert a request to get the file.
2. If FILE DOCK_REQ_FLG=No Set FILE_DOCK_REQ_FLG=Yes Insert a row into S_DOCK_REQ_REF
Type R:
1. Set FILE_DOCK_STAT_FLG=Not Exits If the file is published and it has not been requested yet, then insert a request to get the file.

Appendix 6
S_FILE_POSTN

This table stores a list of positions that have access to a given file.

| Column Name | Type | Constraints | Comments |
| --- | --- | --- | --- |
| ROW ID | VARCHAR(15) | not null primary | |
| CREATED | DATE | not null | |
| CREATED_BY | VARCHAR(15) | not null | |

-continued

| Column Name | Type | Constraints | Comments |
| --- | --- | --- | --- |
| LAST_UPD | DATE | not null | |
| LAST_UPD_BY | VARCHAR(15) | not null | |
| MODIFICATION_NUM | NUMBER | not null | |
| CONFLICT_ID | VARCHAR(15) | not null | |
| FILE_ID | VARCHAR(15) | not null ref(File/Unique1) | |
| POSITION ID | VARCHAR(15) | not null ref(Postn) Unique2 NonUnique1 | |

TOC file lists
   file name,
   file size,
   target directory,
   whether the mobile client can defer downloading the file (i.e. the defer flag), the name of the file table and the row id of the file table row visibility strength of the dock object instance that the file table row is part of the database.

Appendix 7
Redundant Transfer a file attachment row may be referenced in multiple transactions that are routed to the client, so the same file will be written to the inbox multiple times. Previously, the file names were translated to unique strings during the transfer, so the collision was undetectable. Now, the filenames stored as <ROW ID>.<extension>. So, when we retrieve files to the inbox directory or write files to the outbox directory,if the file already exists and has the same date and size, we do not need to copy the file again. [Build tree of file sizes—if file sizes match, check if same name.]

If a user keeps modifying a file on their laptop, they will end up creating multiple revisions of the file that need to be transferred to the server. If only the file is modified during each transaction (that is, only the FILE_DATE, FILE_SIZE, and FILE_REVISION columns are changed, along with the actual file attachment), then it would be desirable to eliminate the intermediate file revisions and only transfer the final revision. According to a further embodiment of our invention a "push table" is used. This is analogous to the request table. File table transactions that only modify the file are not logged; instead, the file table name, file row id, and current row values are logged to a push table. When the client docks, it creates a DX file containing synthetic a push table. When the client docks, it creates a DX file containing synthetic transactions based upon the push table, creating dock opers that reference the most current revision of each listed file. In addition, the client must push the most current revision of each file to the server. Finally, if a file table transaction modifies more than just a file attachment, then the router must write a TOC file entry, log the transaction and delete the file from the push table before it commits.

Deleting of Old Revisions

Each node only needs to retain a single revision of a Request or Published file. However, it may be desirable to keep around old revisions of these files that have not yet been merged, in order to guarantee that other nodes receive the appropriate revision of the file when they merge the transaction containing the attachment. In addition, the deletes cannot precede the transaction commit, since the database would be inconsistent if the transaction did not commit. Finally, for the case of dbinit and upgrade, the moves and deletions must be reversible in order to cause the database and file system to revert to their previous state if the initialization or upgrade cannot run to completion. In order to accomplish these goals, file deletions are scheduled in a list called a deletion queue.

For the first case, where files are kept until the transactions are merged, all routed transactions are entered onto the queue. The merging process must determine if a transaction has been merged at all the appropriate recipients, and only then can it remove the transaction from the queue and delete any associated file. If the goal of maintaining revisions for merging is discarded, a much simpler mechanism will work for the transaction merger. In this case, the merger only stores the names of old file revisions on a queue as it applies updates to the database. After it commits each transaction, it deletes every file revision listed in the queue. This delete queue can reside in volatile memory—if the system crashes after the commit but before all the deletions are complete, the system is still in a consistent state, although the file server will retain some obsolete revisions. A simple cleanup process could detect and eliminate these obsolete revisions if necessary.

For the case of dbinit and upgrade, the upgrade process must not delete any revision from the queue until the entire upgrade has been processed. A similar mechanism is needed for tracking the movement of files from the inbox to the file directory—if the upgrade does not succeed, the files must be returned to the inbox. Note that the TOC file does not contain sufficient information to determine which file revisions have been modified from the inbox to the file directory, since a transaction can apply any revision of a Request or Published file. However, if the upgrade copies, rather than moves, the files from inbox, and adds the inbox entries to the delete queue, then the overall result is very similar to a reversible list of moves. The move list would need to be stable, so if the machine crashed during an upgrade, a recovery process would read the move list and replace the files to their original locations. For the case of using the combination of file copying and a delete queue, the delete queue can reside in volatile memory. If the system crashes before the upgrade completes, the original files still reside in the inbox. Like the transaction merger example, a failure after the final commit could leave some file revisions in the inbox, but the system will still be consistent.

Appendix 8

S_DOCK_REQ_REF (new table)

This table stores requests to retrieve files in the next docking session. This table is only used on mobile clients and is not replicated.

| Column Name | Type | Constraints | Comments |
|---|---|---|---|
| ROW ID | VARCHAR(15) | Primary Not null | |
| CREATED | DATE | Not null | |
| CREATED_BY | VARCHAR(15) | Not null | |
| LAST_UPD | DATE | Not null | |
| LAST_UPD_BY | VARCHAR(15) | Not null | |
| MODIFICATION_NUM | NUMBER(10) | Not null | |
| CONFLICT_ID | VARCHAR(15) | Not null | |
| REQ_ROW_ID | VARCHAR(15) | Not null Unique1 | |
| REQ_TBL_NAME | VARCHAR(30) | Not null Unique2 | |
| REQ_TYPE_CD | VARCHAR(30) | Not null Unique1 | |

Appendix 9

Downloading File Attachments for Dbinit

During init, bring down the .snp file, the .toc file, and all 'B' literature, bring down 'P' literature as well. During the upgrade wizard phase of initialization, move all 'B' files from the inbox to the files directory, move all 'P' files that were downloaded to the files directory, and request all files that weren't downloaded.

All 'R' files are ignored.

Data Model Specification

S_TABLE (new column)

Add a new column to indicate whether a table is a file table. The invention uses this attribute for replicating file attachments.

| Column Name | Type | Constraints | Comments |
|---|---|---|---|
| FILE_TBL_FLG | CHAR(i) | | 'Y' or NULL - the table is a file table 'N' - the table is not a file table |

S_DOCK_REQ_REF (new table)

This table stores requests to retrieve files in the next docking session. This table is only used on mobile clients and is not replicated.

| Column Name | Type | Constraints | Comments |
|---|---|---|---|
| ROW_ID | VARCHAR(15) | Primary Not null | |
| CREATED | DATE | Not null | |
| CREATED_BY | VARCHAR(15) | Not null | |
| LAST_UPD | DATE | Not null | |
| LAST_UPD_BY | VARCHAR(15) | Not null | |
| MODIFICATION_NUM | NUMBER(10) | Not null | |
| CONFLICT_ID | VARCHAR(15) | Not null | |
| REQ_ROW_ID | VARCHAR(15) | Not null Unique1 | |
| REQ_TBL_NAME | VARCHAR(30) | Not null Unique2 | |
| REQ_TYPE_CD | VARCHAR(30) | Not null Unique1 | |

Standard Columns in File Tables

All file tables must have the columns below in addition to any business object specific columns. The invention looks for these columns in a file table to identify the location, name and status of a file.

| Column Name | Type | Constraints | Comments |
|---|---|---|---|
| FILE_EXT | VARCHAR(10) | not null | Operating system name of the file. This does not include the directory path. |
| FILE_SRC_TYPE | VARCHAR(30) | | The type of the original file. This can be a "FILE", "web", " ", "Documentum" and so on. |
| FILE_SRC_PAT | VARCHAR(255) | | The path name of the original file. For operating system files, this is the full path name of the operating system file. For files, this is the relative path to the file in the file system. For world wide web pages, this is the URL of the web page. |
| FILE_SIZE | NUMBER(1,0,0) | not null | Size of the file in bytes |
| FILE_DATE | DATE | not null | Date and time the file was last updated |

-continued

| Column Name | Type | Constraints | Comments |
|---|---|---|---|
| FILE_REV_NUM | VARCHAR(15) | | Revision for the file |
| FILE_DEFER_F | CHAR(1) | not null | 'B'- File is broadcasted and is not deferrable: The invention must always replicate this file to all mobile users when replicating this row. 'P' - File is published. It is deferrable but should be retrieved if possible 'R' - File is deferrable and should only be retrieved when requested by the mobile user. |
| FILE_AUTO_UPD_FLG | CHAR(I) | | 'Y' - Always download and apply updates to this file if the file is defferrable and a local copy of the file exists (i.e. the mobile user has requested the file) 'N' - Do not download and apply updates to the file. Dock status will change to 'O' (out of date) if the file is updated on a remote database. |
| FILE_DOCK_REQ_FLG | CHAR(1) | | 'Y' - Row exists in the S_DOCK_REQ_REF table to retrieve the file in the next The invention session. 'N' - Row does not exist in the S_DOCK_REQ_REF. |
| FILE_DOCK_STAT_FLG | CHAR(1) | | The invention uses this column to denote the status of a file in the current database. The dbms of our invention does NOT replicate this column. 'E' - the file exists in accessible when connected to the current database. 'N' - the file does not exist when connected to the current database. 'O' - the local copy of the file is out of date and an updated version of the file exists. Business Object Specific Columns |
| CDROM_NAME | VARCHAR(250) | | |
| VOLUME_NAME | VARCHAR(15) | | |

S FILE

This table stores information about files for the File business object.

| Column Name | Type | Constraints | Comments |
|---|---|---|---|
| ROW_ID | VARCHAR(15) | not null Primary | |
| CREATED | DATE | no null | |
| CREATED_BY | VARCHAR(15) | not null | |
| LAST_UPD | DATE | not null | |
| LAST_UPD_BY | VARCHAR(15) | no null | |
| MODIFICATION_NUM | NUMBER | not null | |
| CONFLICT_ID | VARCHAR(15) | not null | |
| NAME | VARCHAR(75) | not null | User friendly name of the file |
| DESC_TEXT | VARCHAR(255) | | Comments for the file |
| ENTERPRISE_FLG | CHAR(1) | | 'Y' - enterprise visible file 'N' - only visible to team members |
| PUBLISH_FLG | CHAR(1) | | 'Y' - push file to mobile users. I think we should replace this with a priority (High, Medium, Low, etc. |
| PUBLISH_DT | DATE | | |
| CDROM NAME | VARCHAR(250) | | |
| VOLUME NAME | VARCHAR(15) | | |
| DESC_TEXT | VARCHAR(255) | | Comments for the file |
| START_DT | DATE | | Start date when file can be viewed and edited |
| END_DT | DATE | | End date when file can be viewed and edited |
| FILE_TYPE | VARCHAR(30) | | Used for spawning the 3rd party executable to view and edit the file. Also to denote correspondence template or literature file. |
| DIR_NAME | VARCHAR(255) | not null | Directory path for the file relative to the root directory of the file system |
| FILE_EXT | VARCHAR(10) | not null | Operating system name of the file. This does not include the directory path. |
| FILE_SRC_TYPE | VARCHAR(30) | | The type of the original file. This can be "FILE", "web", "", "Documentum". |
| FILE_SRC_PATH | VARCHAR(255_ | | The path name of the original file. For operating system files, this is the full path name of the operating system file. For files, this is the relative path to the file in the file system. For world wide web pages, this is the URL of the web page. |
| FILE_SIZE | NUMBER(10,0) | not null | Size of the file in bytes |
| FILE_DATE | DATE | not null | Date and time the file was last updated |
| FILE_REV_NUM | VARCHAR(15) | | Revision for the file |
| FILE_DEFER_FLG | CHAR(1) | not null | 'B' - File is broadcast and is not deferrable: The invention must always replicate this file to all mobile users when replicating this row. |

-continued

| Column Name | Type | Constraints | Comments |
|---|---|---|---|
| | | | 'P' - File is publised. It is deferrable but should be retrieved if possible<br>'R' - File is deferrable and should only be retrieved when requested by the mobile user. |
| FILE_AUTO_UPD_FLG | CHAR(1) | not null | 'Y' - Always download and apply updates to this file if the file is defferable and a local copy of the file exists (i.e. the mobile user has requested the file)<br>'N' - Do not download and apply updates to the file. Dock status will change to 'O' (out of date) if the file is updated on a remot database. |
| FILE_DOCK_REQ_FLG | CHAR(1) | | 'Y' - Row exists in the S DOCK REQ REF table to retrieve the file in the next The invention session.<br>'N' - Row does not exist in the S_DOCK_REQ_REF. |
| FILE_DOCK_STAT FLG | CHAR(I) | | The invention uses this column to denote the status of a file in the current database, the invention does NOT replicate this column.<br>'E' - the file exists in accessible when connected to the current database.<br>'N' - the file does not exist when connected to the current database.<br>'O' - the local copy of the file is out of date and an updated version of the file exists. |

S_FILE_POSTN

This table stores a list of positions that have access to a given file.

| Column Name | Type | Constraints | Comments |
|---|---|---|---|
| ROW_ID | VARCHAR(15) | not null Primary | |
| CREATED | DATE | not null | |
| CREATED_BY | VARCHAR(15) | not null | |
| LAST_UPD | DATE | not null | |
| LAST_UPD_BY | VARCHAR(15) | not null | |
| MODIFICATION_NUM | NUMBER | not null | |
| CONFLICT_ID | VARCHAR(15) | not null | |
| FILE_ID | VARCHAR(15) | not null ref(File) Unique1 | |
| POSITION ID | VARCHAR(15) | not null ref(Postn) Unique2 NonUnique1 | |

Algorithm and Procedures
  Details needed to implement this feature:
    Details for specialized business component and frame Modified docking request layer messages Exact structure of TOC file Modified Txn Router algorithm Modified data merge algorithm Modified algorithm for extracting and initializing files Storage and user interface for download file preferences for mobile users
  Downloading File Attachments for Dbinit
    During init, bring down the .snp file, the .toc file, and all 'B' literature, bring down 'P' literature as well. During the upgrade wizard phase of initialization, move all 'B' files from the inbox to the files directory, move all 'P' files that were downloaded to the files directory, and request all files that weren't downloaded.
    Ail 'R' files are ignored.
Table of Contents Files for Routing File Attachments
  In the architecture of the system, method, apparatus, and program product of the invention, a Transaction Router extracts transactions that are visible for a remote user and aggregates them in transaction (DX) files on the server. This document describes a design where the transaction router creater an auxiliary file called a Table of Contents (TOC) file that lists the file attachments referenced by the transactions stored in the DX file. The Docking Client retrieves the TOC file from server upon docking, and then the client retrieves the associated attachments listed in the TOC file. In addition, the client may send transactions with attachments to the server, and the Transaction Merger must apply the files associated with the transactions.
  The docking request layer must support the following:
    Determine if a DX file has an associated TOC file. Inform the docking client of the existence of the TOC file when the associated DX file is opened. Transfer the TOC file to the client upon request. Transfer the file attachments to the client or server upon request and preserve file meta-data (e.g. creation date, modification date, file owner) if possible.
TOC Routines
  The server and client facilities that use TOC information are able to access the TOC file using the following routines.
DXTOCHandle
  Input: Full DX or Snapshot Filename (with path and extension), Read or Write (/Append) flags, pointer to dictionary
  Returns: File handle
DXTOCFileOpen
  Input: None—uses initialization parameters from handle creation.
  Returns: error status
  Open a TOC file for reading or writing.
DXTOCFileClose
  Input: File handle
  Returns: error status
  Close a TOC file
DXTOCRead
  Input: TOC file entry pointer
  Returns: error status
  Read a single file attachment entry from a TOC file and write it to the supplied TOC file entry structure.
DXTOCWrite
  Input: TOC file entry pointer
  Returns: error status
  Write a single file attachment entry to a TOC file.
Transaction Router
  When the transaction router writes a file table row to a DX file, it writes the information about the associated file to the TOC file. If the TOC file does not exist, then one is created. The TOC file has the same number as the DX file, but it has a TOC extension.

DRL and Client Download

The Docking Request Layer FileOpen method takes a new parameter to specify whether a numbered file is a DX file or a TOC, and this method must indicate whether a DX file has an associated TOC. After the client downloads a TOC file from the server, it reads the TOC to discover which file attachments must be downloaded.

Transaction Merger and Client Upload

When the docking client is extracting transactions to a DX file, it also creates a TOC file. However, the client does not upload its TOC file to the server. Instead, upon docking, it uses the TOC file to determine what files to transfer, and the client transfers those files directly. As the transaction merger applies the client transactions to the server database, it moves the associated files from the inbox to file system.

TOC File Implementation

Data Structures

DXTOCRead and DXTOCWrite use the following TOC Entry structure.

struct DXTOCEntry

TOC File Routines

In addition to the basic routines described in the overview, the CDXTOC module acts as a C wrapper for the DXTOC class, and a couple of additional routines are provided:

CDXTOCWriteOper

Input: Encapsulated DXTOC handle, UTLDLog Dockoper pointer Returns: error status During Transaction Routing, write a single file attachment entry to a TOC file (and open the TOC file if necessary). The dockoper is examined—if it is an update or insert transaction on a file table that modifies the FILE_DATE column then a TOC file entry is written. The Transaction Router calls this function after UTLDLogFileWriteOper in various places, e.g. LRT-Main.

CDXTOCDataFileCb

Input: UTLData Callback context and various arguments Returns: BOOL error status During DBXTRACT, write file attachment entries to a TOC file (and open the TOC file if necessary) for all files listed in a file table when that table is exported. This function is a callback for UTLDataExportSqt.

DRL and Client Download

The Docking Request Layer FileOpen method takes a new parameter of type DRLFileExtension to specify the extension for numbered files, defined as:

```
{
    CHAR szFileName[DB_MAX_FILENAME_LEN+1];      //file name
    LONG FileSize:                                //file size
    CHAR szDateTime[DB_MAX_DATETIME_LEN+1]       //modification
date of file
    //0 - file is not deferrable
    //1 - file is deferrable but should be retrieved if possible
    //2 - file is deferrable and should only be retrieved
    when requested by user
        CHAR DeferDownload[2];                    //if client can
    defer download
        CHAR szFileTable[DB_MAX_TBL_NAME_LEN+1]; //name of the file
        table
        CHAR szRowId[DB_MAX_ROWID LEN+1];        //rowid of file table
        row
        //Visiblity Strength of the dock object instance of which the
        //file table row is part.
        CHAR szVisStrength[DB MAX VISSTRENGTH LEN+1];
}
```

TOC File Layout

The TOC File is written in plain text configuration file format. The TOC routines will be built out of primitives from common\os\utlcfg.h. Each TOC entry is written as a separate section, where the section name identifies the position of the attachment in the DX file (File1, File2, etc.), and the other fields are written as key/value pairs. A sample entry for a couple of files follows:

[FILE 2]
szFileName=Current Quote.rtf
FileSize=2189
szDateTime=1997-09-26 19:13:31
DeferDownload=Y
szFileTable=S LIT
szRowId=10-SMIK
szVisStrength=0
[FILE 3]
szFileName=hostname.txt
FileSize=41
szDataTime=1997-09-26 19:13:35
DeferDownload=Y
szFileTable=S
LIT szRowId=10-SMIL
szVisStrength=0

// Legal Extensions for numbered files
enum DRLFileExtension

```
{
    DRLFXUnSpecified       = 0,
    DRLFXSnapshot          = 1,      // SNP
    DRLFXTableOfContents   = 2,      // TOC
    DRLFXTransaction       = 3       // DX
};
```

In addition, this method takes an extra boolean output parameter to indicate whether a DX or snapshot file being opened has an associated TOC file.

Opening a TOC file and downloading it to the client is identical to the procedure for downloading a DX file, with the exception of the specification of DRLFXTable OfContents versus DRLFXTransaction.

When the client downloads a file attachment, it uses the file name version of the FileOpen method:

// specify complete input and output file manes
// (ie name.extension, no path)
int FileOpen(DRLFileTransfer TransferType, BOOL bContinueTransfer, LONG SeekTo, CHAR* szInputFileName, CHAR* szOutputFileName, int* FileHandle, LONG*FileSize);

Using the rowid and extension values from the TOC file, the input file name is of the form <ROWID>.<REVISION>, and the output file name is the same.

Finally, the file attachment modification date should match the original modification date on the server. [Note: Need OSD]

Redundant Transfer

A file attachment row may be referenced in multiple transactions that are routed to the client, so the same file will be written to the inbox multiple times. Previously, the file names were translated to unique strings during the transfer, so the collision was undetectable. Now, the filenames stored as <ROW ID>.<extension>. So, when we retrieve files to the inbox directory or write files to the outbox directory, if the file already exists and has the same date and size, we do not need to copy the file again. [Build tree of file sizes—if file sizes match, check if same name]

If a user keeps modifying a file on their laptop, they will end up creating multiple revisions of the file that need to be transferred to the server. If only the file is modified during each transaction (that is, only the FILE_DATE,FILE_SIZE, and FILE_REVISION columns are changed, along with the actual file attachment), then it would be desirable to eliminate the intermediate file revisions and only transfer the final revision. According to a further embodiment of our invention a "push table" is used. This is analogous to the request table. File table transactions that only modify the file are not logged; instead, the file table name, file row id, and current row values are logged to a push table. When the client docks, it creates a DX file containing synthetic transactions based upon the push table, creating dock opers that reference the most current revision of each listed file. In addition, the client must push the most current revision of each file to the server. Finally, if a file table transaction modifies more than just a file attachment, then the router must write a TOC file entry, log the transaction and delete the file from the push table before it commits.

File Transfer and Merging Revisited

Instead of storing files as <ROWID>.<REVISION>, where the revision is another, globally-unique rowid. For example, the file "foo.bar" on the server could be assigned the unique name f.s01, and it would get copied to client A and Client B with this name.

When Client A and Client B create new revisions of "foo.bar", each one gets a globally-unique name. On Client A the new revision is stored as f.a01, and on Client B the new revision is stored as f.b01. If Client A docks with the server, the file f.a01 is routed to the client inbox on the server. When the Transaction Merger applies the transaction, it will see that the FILE_DATE column has been modified for file "foo.bar". For this particular transaction, the update will show that Client A has an old value of f.s01 and a new value of f.a01. The actual value on the server is f.s01, so there is no conflict. The merge proceeds as follows:

1. The old value f.s01 is saved in a list in the merger.
2. The row in the database is updated with the new values (but not committed yet), including the new revision a01. Note that on a system with consistent read, other readers will still see the old revision s01 and reference the correct file.
3. If the file f.a01 is not on the server file system, then the file is moved from the inbox to the file system. Several points to consider here:
    We can safely move a file from the inbox to the file system because every file has a globally-unique name. No other client could have or can generate the same name as f.a01 in the past, present or future, so we cannot overwrite a file accidentally.
    We now have two copies of the file in the file system. However, with consistent read, readers will till see the old file.
    If the system crashes after the move and before the current transaction is committed, then the transaction will be re-merged upon recovery. When the merger gets the step 3, it will discover that f.a01 is already in the file system, so it doesn't need to perform the move. If the move fails and the file is lost, there is still a copy of f.a01 on Client A. The merger should rollback the current transaction and reset the RECEIVE value in S_DOCK STATUS so Client A resends the DX file and its associated file attachments.
    If the file is lost and the system crashes, upon recovery, the merger will re-merge the current transaction and discover that the file is not in the inbox or in the file system. At that point, it should rollback the transaction and reset RECEIVE to force the client to resent the file.
    If the system crashes during the move and corrupts the file, the merger could still detect this problem if it performs an additional check of the FILE_SIZE column versus the actual file size.
4. If the move is successful, the merger logs a transaction and commits. When readers re-query the file table row that references "foo.bar", they will see the new revision.
5. After the commit, the merger can safely delete the old file f.s01. If the system crashes before the delete but after the commit, we lose the information about old files on the delete list. At worst, some outdated revisions of the file will waste space on the file server. With some small effort we could construct a clean-up program that tracks down all unreferenced files on the server and deletes them.

If Client B docks with the server after Client A, it routes the file f.b01 is routed to the client inbox on the server. When the Transaction Merger applies the transaction, it will see that the FILE_DATE column has been modified for file "foo.bar". For this particular transaction, the update will show that Client B has an old value of f.s01 and a new value of f.b01. But now, the actual value on the server is f.a01, so there is a conflict. If the rule is the default that "server wins", then the transaction cannot be applied, and the file f.b01 is deleted from the inbox.

Deleting Old Revisions of Files

A major issue with the "aggressive" deletion policy proposed in the previous section is that TOC file entries for old files will be invalidated. In the previous example, where the old file f.s01 is deleted, it could have been referenced in the TOC file for a third docking client that has not docked yet. In addition, a change in visibility rules could mean that this other client should never see the revision f.a01 from Client A, so only revision f.s01 could be routed to this client. Some alternate revision control policies are listed.

1. One method: keep old revisions of all files, and periodically purge them by date (e.g. all unreferenced revisions of files older than one week are deleted) or by maximum number (delete the oldest unreferenced revision of a file when the revision count exceeds a certain number). If the purging period is slightly larger than the average docking interval, then a docking client should find the correct revision of a file with high probability.
2. Exact file method: delete aggressively, and deal with the fact that the merger may not find revision associated with the transaction.
3. Get Latest Always: docking client always find the latest revision of a file on the server. This approach eliminates the redundant downloading of multiple revisions of the same file, when the client is likely to apply all the transactions and only need the final revision. However, since the client receives routed transactions that are slightly older than the current server database, the final revision of the file in the dx file might always be older than the latest revision, so the client would never have a valid revision. In addition, a change to visibility rules might mean that the client should never see this revision.

4. Combination: for example, try to get exact file, and if it is not on the server, then see if the client has an old revision, else get the latest from the server.

A docking client can use some additional alternate deletion mechanisms. Because a client routes every transaction (and every file attachment) to the server, the client can move an old revision of the file from the file system to tis outbox. When the client sees that the server has processed a DX file (via S_DOCK_STATUS), it can delete all of the file revisions in its outbox listed in the associated TOC file, then delete the TOC file and the DX file. Note that the client may end up moving the initial revision of a file to its outbox, and the initial revision does not get routed back to the server. However, the initial revision is listed in the TOC file for the snapshot, so if the client keeps the snapshot TOC file, it can always delete revisions listed in this TOC file from the outbox. When the client re-initializes its database, it should always delete the complete contents of the outbox.

Merging File Attachments

Whether file attachments are propagated via standard transaction routing, dbextract/dbinit, or upgrade, they need to be applied in a common, consistent manner. For every row that is merged, the merge process must examine the row and determine if it comes from a file table. If the row does come from a file table, the merge process must check the FILE_REV_NUM column and see if the value has changed. If the FILE_REV_NUM column has changed, the merge process must find the file attachment in the inbox and attempt to apply it to the database. Every revision of a file attachment is uniquely identified with a name of the form <ROWID>.<FILE REV NUM>. Every version of the file has the same, common ROWID prefix, with a distinct FILE_REV_NUM suffix. The general behavior of the merge is to search for the exact file revision in the INBOX and to apply the file and update the database according to the file attachment type. The type, stored in FILE_DEFER_FLG, is Broadcast, Published, or Request.

Case 1: Found Exact Revision in Inbox
 For all types B, P, and R:
1. Move the file from the inbox to the file directory. If there is an older revision of the file in the file directory and the file is deferrable (P or R), then queue the old revision for deletion after the transaction commits.
2. Set FILE_DOCK_STAT_FLG=Exits
3. Set FILE_DOCK_REQ_FLG=No and delete any pending request in S_DOCK_REQ_REF.

If the exact revision of the file is not found in the inbox, the merger should search for it in the file directory to see if it had been moved there previously. If the exact revision is already in the file directory, then the merger need only execute steps 2 and 3 of Case 1. If the merger cannot locate the exact revision, it should look for any revision of the file in the INBOX.

Case 2. Found Any Revision in Inbox
 For type B:
 Return an error. Broadcast files must have an exact match.
 For types P and R:
1. Move the file from the inbox to the file directory. If there is an older revision of the file in the file and the file is deferrable (P or R), then queue the old revision for deletion.

2. Set FILE_DOCK_STAT FLG=Out Of Date
 If the customer has set a preference to automatically retrieve new revisions of the file, and the file has not been requested yet, then insert a request to get the file.
3. If FILE_AUTO_UPD FLG=True
 If FILE_DOCK_REQ_FLG=No
   Set FILE_DOCK_REQ_FLG=Yes
   Insert a row into S_DOCK_REQ_REF
 Else // no auto update
   Set FILE_DOCK_REQ_FLG=No and delete any pending request in S_DOCK REQ_REF.

If no revision of the file is found in the inbox, the merger should search for any revision in the file directory. If any revision is already in the file directory, then the merger need only execute steps 2 and 3 of Case 2. If the merger cannot locate the any revision, it should perform one of the following actions in Case 3.

Case 3: No Revision found anywhere
 Type B:
 Return an error. Broadcast files must have an exact match.
 Type P:
1. Set FILE_DOCK_STAT_FLG=Not Exists
 If the file is published and it has not been requested yet, then insert a request to get the file.
2. If FILE_DOCK_REQ_FLG=No
 Set FILE_DOCK_REQ_FLG=Yes
 Insert a row into S_DOCK_REQ_REF
 Type R:
1. Set FILE_DOCK_STAT_FLG=Not Exists
 If the file is published and it has not been requested yet, then insert a request to get the file.

Deleting of Old Revisions

Each node only needs to retain a single revision of a Request or Published file. However, it may be desirable to keep around old revisions of these files that have not yet been merged, in order to guarantee that other nodes receive the appropriate revision of the file when they merge the transaction containing the attachment. In addition, the deletes cannot precede the transaction commit, since the database would be inconsistent if the transaction did not commit. Finally, for the case of dbinit and upgrade, the moves and deletions must be reversible in order to cause the database and file system to revert to their previous state if the initialization or upgrade cannot run to completion. In order to accomplish these goals, file deletions are scheduled in a list called a deletion queue.

For the first case, where files are kept until the transactions are merged, all routed transactions are entered onto the queue. The merging process must determine if a transaction has been merged at all the appropriate recipients, and only then can it remove the transaction from the queue and delete any associated file. If the goal of maintaining revisions for merging is discarded, a much simpler mechanism will work for the transaction merger. In this case, the merger only stores the names of old file revisions on a queue as it applies updates to the database. After it commits each transaction, it deletes every file revision listed in the queue. This delete queue can reside in volatile memory if the system crashes after the commit but before all the deletions are complete, the system is still in a consistent state, although the file server will retain some obsolete revisions. A simple cleanup process could detect and eliminate these obsolete revisions if necessary.

For the case of dbinit and upgrade, the upgrade process must not delete any revision from the queue until the entire upgrade has been processed. A similar mechanism is needed for tracking the movement of files from the inbox to the file directory—if the upgrade does not succeed, the files must be returned to the inbox. Note that the TOC file does not contain sufficient information to determine which file revisions have been moved from the inbox to the file directory, since a transaction can apply any revision of a Request or Published file. However, if the upgrade copies, rather than moves, the files from inbox, and adds the inbox entries to the delete queue, then the overall result is very similar to a reversible list of moves. The move list would need to be stable, so if the machine crashed during an upgrade, a recovery process would read the move list and replace the files to their original locations. For the case of using the combination of file copying and a delete queue, the delete queue can reside in volatile memory. If the system crashes before the upgrade completes, the original files still reside in the inbox. Like the transaction merger example, a failure after the final commit could leave some file revisions in the inbox, but the system will still be consistent.

We claim:

1. A method in a computing system for augmenting a database table, comprising:

displaying the database table, the database table comprising a plurality of fields arranged into rows and columns;

receiving user input selecting a field in the database table;

receiving user input specifying a non-database file stored outside the database table to attach to the selected field; and attaching the specified non-database file to the selected field.

2. The method of claim 1 wherein the attaching includes storing in the selected field a reference to the specified non-database file usable to retrieve the specified non-database file.

3. The method of claim 1 wherein the displayed database table is a relational database table.

4. The method of claim 1, further comprising constructing an index on the contents of a selected one of the columns of the displayed database table.

5. The method of claim 1, further comprising joining the displayed database table with a second database table.

6. The method of claim 1, further comprising:

replicating a portion of the displayed database table containing the selected field; and in response to replicating a portion of the displayed database table containing the selected field, replicating the attached non-database file in conjunction with the replicated portion of the displayed database table.

7. The method of claim 6 wherein the attached non-database file is replicated automatically, irrespective of further user input.

8. The method of claim 6, further comprising receiving user input specifying whether the attached non-database file is to be replicated in conjunction with the replicated portion of the displayed database table, and wherein the attached non-database file is replicated only where the received user input specifies that the attached non-database file is to be replicated in conjunction with the replicated portion of the displayed database table.

9. The method of claim 1, wherein a portion of the fields of the displayed database are shared among a group of users, the method further comprising sending the attached non-database file to at least a subset of the group of users.

10. A computer memory whose contents cause a computing system to augment a database table by:

displaying the database table, the database table comprising a plurality of fields arranged into rows and columns;

receiving user input selecting a field in the database table;

receiving user input specifying a non-database object stored outside the database table to attach to the selected field; and attaching the specified non-database object to the selected field.

11. The memory of claim 10 wherein the attaching includes storing in the selected field a reference to the specified non-database file usable to retrieve the specified non-database file.

12. The memory of claim 10 wherein the displayed database table is a relational database table.

13. The memory of claim 10 wherein the contents of the memory further cause the computing system to construct an index on the contents of a selected one of the columns of the displayed database table.

14. The memory of claim 10 wherein the contents of the memory further cause the computing system to join the displayed database table with a second database table.

15. The memory of claim 10 wherein the contents of the memory further cause the computing system to:

replicate a portion of the displayed database table containing the selected field; and replicate the attached non-database file in conjunction with the replicated portion of the displayed database table in response to replicating a portion of the displayed database table containing the selected field.

16. The memory of claim 15 wherein the attached non-database file is replicated automatically, irrespective of further user input.

17. The memory of claim 15 wherein the contents of the memory further cause the computing system to receive user input specifying whether the attached non-database file is to be replicated in conjunction with the replicated portion of the displayed database table, and wherein the attached non-database file is replicated only where the received user input specifies that the attached non-database file is to be replicated in conjunction with the replicated portion of the displayed database table.

18. The memory of claim 10 wherein a portion of the fields of the displayed database are shared among a group of users, wherein the contents of the memory further cause the computing system to send the attached non-database file to at least a subset of the group of users.

19. A computing system for augmenting a database table, comprising:

a display device that displays the database table, the database table comprising a plurality of fields arranged into rows and columns;

a user input subsystem that receives input selecting a field in the database table, and receives input specifying a non-database file stored outside the database table to attach to the selected field; and an attachment subsystem that attaches the specified non-database file to the selected field.

* * * * *

UNITED STATES PATENT AND TRADEMARK OFFICE
CERTIFICATE OF CORRECTION

PATENT NO. : 6,732,111 B2
DATED : May 4, 2004
INVENTOR(S) : Robert A. Brodersen et al.

It is certified that error appears in the above-identified patent and that said Letters Patent is hereby corrected as shown below:

Column 29,
Line 54, "the" should be -- then --;

Column 31,
Line 3, delete ";" between "FIG. 9." and "When";
Line 37, "crashed" should be -- crashes --;
Line 40, "roolback" should be -- rollback --;

Column 32,
Line 35, "route" should be -- routes --;
Line 37, "o f" should be -- of --;

Column 33,
Line 23, "the queue" should be -- then queue --;
Line 38, "inn" should be -- in --;

Column 34,
Line 26, "a" should be -- A --;
Line 32, insert space between "directory," and "if";

Column 35,
Line 15, "memory -- if" should be -- memory if --;

Column 40,
Line 23, "creater" should be -- creates --;

Column 42,
Line 64, "manes" should be -- names --;

UNITED STATES PATENT AND TRADEMARK OFFICE
CERTIFICATE OF CORRECTION

PATENT NO. : 6,732,111 B2
DATED : May 4, 2004
INVENTOR(S) : Robert A. Brodersen et al.

It is certified that error appears in the above-identified patent and that said Letters Patent is hereby corrected as shown below:

<u>Column 43,</u>
Line 23, insert space between "FILE_DATE," and "FILE_SIZE,";
Line 44, "client" should be -- Client --;

<u>Column 44,</u>
Line 5, "till" should be -- still --;

<u>Column 45,</u>
Line 15, "tis" should be -- its --;

Signed and Sealed this

Nineteenth Day of October, 2004

JON W. DUDAS
*Director of the United States Patent and Trademark Office*